United States Patent
Skogen et al.

(10) Patent No.: US 10,609,208 B2
(45) Date of Patent: Mar. 31, 2020

(54) MANAGING DEVICE USAGE

(71) Applicant: Apple Inc., Cupertino, CA (US)

(72) Inventors: Christopher G. Skogen, Los Altos Hills, CA (US); Jean-Pierre Ciudad, San Francisco, CA (US); Julien F. Freudiger, San Francisco, CA (US); Joao Pedro De Almeida Forjaz De Lacerda, Santa Cruz, CA (US); Cyrus Daboo, Pittsburgh, PA (US); Todd R. Fernandez, Mountain View, CA (US); Thomas Alsina, Saratoga, CA (US); Deepak Iyer, Sunnyvale, CA (US); Cody D. Jorgensen, San Jose, CA (US); Edward T. Schmidt, Burlingame, CA (US); Astrid Yi, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/147,547

(22) Filed: Sep. 28, 2018

(65) Prior Publication Data
US 2019/0349469 A1 Nov. 14, 2019

Related U.S. Application Data

(60) Provisional application No. 62/668,814, filed on May 8, 2018, provisional application No. 62/679,893, filed on Jun. 3, 2018.

(51) Int. Cl.
H04M 1/725 (2006.01)
H04L 9/08 (2006.01)
(Continued)

(52) U.S. Cl.
CPC ..... *H04M 1/72577* (2013.01); *G06F 11/3423* (2013.01); *G06F 11/3438* (2013.01); *H04L 9/0822* (2013.01); *H04L 12/06* (2013.01)

(58) Field of Classification Search
CPC ........ H04W 4/24; H04W 12/06; H04W 4/50; H04W 8/18; H04W 28/02; H04W 4/12;
(Continued)

(56) References Cited

U.S. PATENT DOCUMENTS 8,194,581 B1 * 6/2012 Schroeder ............... H04M 3/38
370/313
8,391,680 B2 3/2013 Bhogal et al.
(Continued)

FOREIGN PATENT DOCUMENTS

CN 204069033 12/2014

OTHER PUBLICATIONS

Harari et al., "Using Smartphones to Collect Behavioral Data in Psychological Science: Opportunities, Practical Considerations, and Challenges," Perspect Psychol Sci, Nov. 2016, retrieved from https://www.ncbi.nlm.nih.gov/pmc/articles/PMC5572675/, 25 pages.
(Continued)

Primary Examiner — Daniel Lai
(74) Attorney, Agent, or Firm — Morgan, Lewis & Bockius LLP

(57) ABSTRACT

A device receives a time-based restriction for usage by a first user with respect to an application, a website or a device-level function. The device receives encrypted data indicating a usage by the first user on a second device with respect to the application, website or device-level function. The device determines that at least one of the usage by the first user on the second device or a usage by the first user on the device with respect to the application, website or device-level function violates the time-based restriction. The device
(Continued)

provides, in response to the determining, a notification that the time-based restriction has been violated by the first user.

37 Claims, 10 Drawing Sheets

(51) Int. Cl.
*G06F 11/34* (2006.01)
*H04L 12/06* (2006.01)

(58) Field of Classification Search
CPC ..... H04W 28/0215; H04W 4/70; H04W 4/21; H04W 88/02; H04W 24/02; H04W 48/00; H04W 48/02; H04W 48/08; H04W 48/04; H04W 48/06; H04W 4/00; H04W 4/08; H04W 76/14; H04M 1/72577; G06F 11/3438; G06F 11/3423; H04L 12/06; H04L 9/0822

See application file for complete search history.

(56) References Cited

U.S. PATENT DOCUMENTS

| | | | |
|---|---|---|---|
| 8,443,382 B2 | 5/2013 | Taylor | |
| 8,655,307 B1* | 2/2014 | Walker | H04W 52/0212 |
| | | | 455/405 |
| 8,797,461 B2 | 8/2014 | Davis | |
| 9,241,079 B1 | 1/2016 | Cai | |
| 9,450,962 B2 | 9/2016 | Longhorn | |
| 2008/0201469 A1 | 8/2008 | Reasor et al. | |
| 2014/0113593 A1 | 4/2014 | Zhou | |
| 2016/0119776 A1* | 4/2016 | Rasanen | H04L 12/1407 |
| | | | 455/405 |
| 2016/0360409 A1 | 12/2016 | Singh | |
| 2017/0149795 A1 | 5/2017 | Day, II | |
| 2017/0201850 A1* | 7/2017 | Raleigh | H04W 4/50 |
| 2017/0295258 A1 | 10/2017 | Raleigh | |
| 2018/0102984 A1* | 4/2018 | Dettori | H04L 47/82 |

OTHER PUBLICATIONS

Mafrur et al., "Modeling and discovering human behavior from smartphone sensing life-log data for identification purpose," 2015, retrieved from https://hcis-journal.springeropen.com/track/pdf/10.1186/s13673-015-0049-7, 18 pages.

Matsuda, "Top Smart Phone Apps to Help With Your Child's Behavior," May 7, 2018, retrieved from https://www.collegenanniesandtutors.com/northscottsdaleaz/blog/title/Top-Smart-Phone-Apps-to-Help-With-Your-Childs-Behavior, 3 pages.

Moment, 2018, retrieved from https://inthemoment.io/, 2 pages.

Saint Joseph's University, "7 Apps for Applied Behavior Analysis Theory," retrieved from https://online.sju.edu/graduate/masters-special-education/resources/articles/7-apps-for-applied-behavior-analysis-therapy, 3 pages.

Wehner, "This brilliant app lets you manage screen time for your children," Jan. 2, 2017, retrieved from https://bluetrainenterprises.com.au/blog/2017/01/02/manage-screen-time-children/, 4 pages.

International Search Report and Written Opinion from PCT/US2019/022100, dated Jun. 11, 2019, 14 pages.

* cited by examiner

MANAGING DEVICE USAGE

CROSS-REFERENCE TO RELATED APPLICATIONS

The present application claims the benefit of U.S. Provisional Patent Application Ser. No. 62/668,814, entitled "MANAGING DEVICE USAGE TIME," filed May 8, 2018, and the benefit of U.S. Provisional Patent Application Ser. No. 62/679,893, entitled "MANAGING DEVICE USAGE," filed Jun. 3, 2018, each of which is hereby incorporated herein by reference in its entirety and made part of the present U.S. Utility Patent Application for all purposes.

TECHNICAL FIELD

The present description relates generally to operating a device, including managing device usage time.

BACKGROUND

With users increasingly spending more time interacting with their computing devices, e.g., phones, tablets, computers, and the like, concerns may be rising with respect to the appropriate amount of time that a user should be interacting with their computing devices (e.g., per day), as well as possible concerns related to excessive computing device usage.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
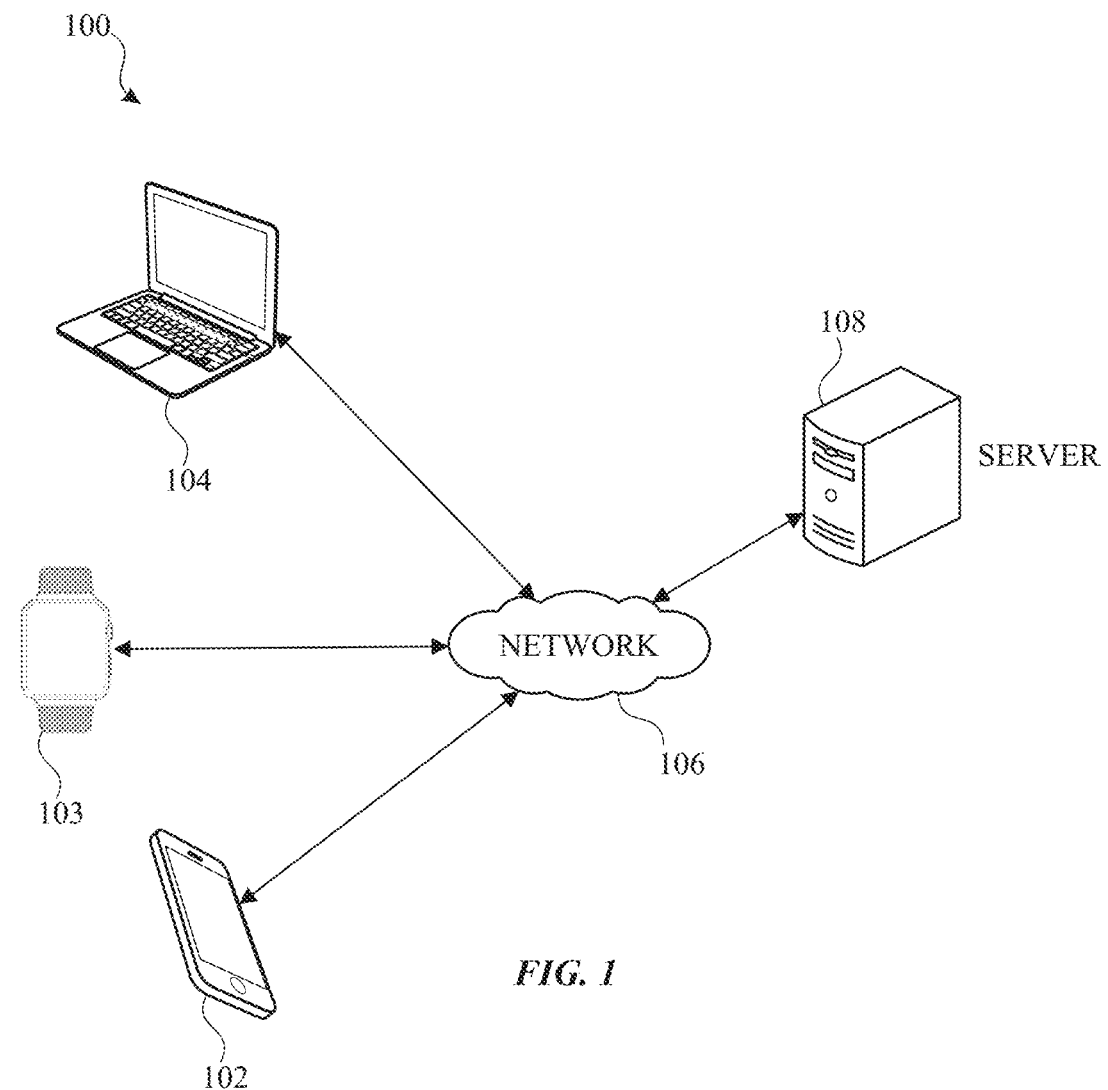
FIG. 1 illustrates an example network environment for managing device usage time in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A user may wish to limit and/or manage the amount of time personally spent using their electronic device(s). For example, the user may wish to limit personal usage with respect to specific applications/websites, specific categories of applications/websites, and/or specific device-level functions (e.g., device display, audio, microphone, camera, sensors, accessories and/or hardware resources). In addition, a user (e.g., a parent) may wish to limit and manage the amount of time that another user (e.g., a child) uses their electronic device(s), for example, with respect to applications/websites, categories and/or device-level functions, and/or to define conditions or goals for usage by the other user (e.g., 1 hour of educational reading on the device before being permitted to access other applications).

The subject system provides for setting a time-based restriction for personal device usage, or device usage by another (e.g., a child). The time-based restriction may apply across multiple devices associated with a given user. For example, a first device receives the time-based restriction for usage by the user with respect to an application/website (e.g., or category of applications and/or websites) or a device-level function. The first device receives encrypted data indicating a usage by the user on a second device with respect to the application, website or device-level function. The first device determines that the usage by the user on either or both of the first and second devices violates the time-based restriction. The first device provides a notification that the time-based restriction has been violated by the user.

Moreover, the subject system maintains privacy of the time-based restrictions and of the usage data, so that only the authorized devices (e.g., the user's own devices for personal usage management, and/or the parent/child's devices in usage management for a child) may access the usage data. For example, data indicating usage and/or restrictions may be end-to-end encrypted when communicated between the devices. In the parent and child example, the privacy protection may be implemented by directly sending end-to-end encrypted messages between the parent and child's devices, where the messages indicate the restrictions and usage. Alternatively or in addition, for the parent and child example, a server may store the restriction and/or usage data in an encrypted manner, where parent and child's devices may access the data based on respective keys that are not accessible to the server.

In the personal usage management example, the privacy protection may be implemented by storing the usage data on a server which is only accessible by encryption keys known to the devices and unavailable to the server. Alternatively or in addition, the restriction and/or personal usage data may be synchronized across multiple devices of the user using a device-to-device communication protocol such as Bluetooth, e.g., bypassing the server.

Based on these privacy implementations, whether usage is being managed for another (e.g., a child) or personally, access of the restriction data and/or usage data by unauthorized devices (e.g., including the server) is prevented.

FIG. 1 illustrates an example network environment for managing device usage time in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103 and 104 (hereinafter 102-104), a network 106 and a server 108. The network 106 may communicatively (directly or indirectly) couple, for example, any two or more of the electronic devices 102-104 and/or the server 108. In one or more implementations, the network 106 may be an interconnected network of devices that may include, or may be communicatively coupled to, the Internet. For explanatory purposes, the network environment 100 is illustrated in FIG. 1 as including electronic devices 102-104 and a single server 108; however, the network environment 100 may include any number of electronic devices and any number of servers.

One or more of the electronic devices 102-104 may be, for example, a portable computing device such as a laptop computer, a smartphone, a peripheral device (e.g., a digital camera, headphones, a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 103 is depicted as a smartwatch, and the electronic device 104 is depicted as a laptop computer. Each of the electronic devices 102-104 may be, and/or may include all or part of the device discussed below with respect to FIG. 2, and/or the electronic system discussed below with respect to FIG. 10.

The server 108 may be, and/or may include all or part of the electronic system discussed below with respect to FIG. 10. The server 108 may include one or more servers, such as a cloud of servers, that may be used to facilitate limiting usage for the electronic devices 102-104. A user may use two or more of the electronic devices 102-104, for example, in association with having a registered user account (e.g., a cloud-based, service provider account that provides for usage management) and having been logged into that user account on two of more of the electronic devices 102-104. The server 108 may store encrypted data which may be accessed via key by the respective devices of the user, in order to limit and/or manage personal device usage time.

In another example, a first user (e.g., a parent using the electronic device 104) may limit and/or manage device usage time for a second user (e.g., a child using one or more of the electronic devices 102-103). The corresponding time restriction and data usage information may be communicated between the electronic devices 102-104 in a private manner. For example, this information may be stored on the server 108 as encrypted data, which is accessible via key by the electronic devices 102-104. Alternatively or in addition, such information may be sent directly between the electronic devices 102-104 using a message transport system, so that the information is not stored on the server 108.

For explanatory purposes, a single server 108 is shown and discussed with respect to various operations, such as storing encrypted data related to time-based restrictions and/or data usage. However, these and other operations discussed herein may be performed by one or more servers, e.g., at one or more different data centers, and each different operation may be performed by the same or different servers.

Figure 2:
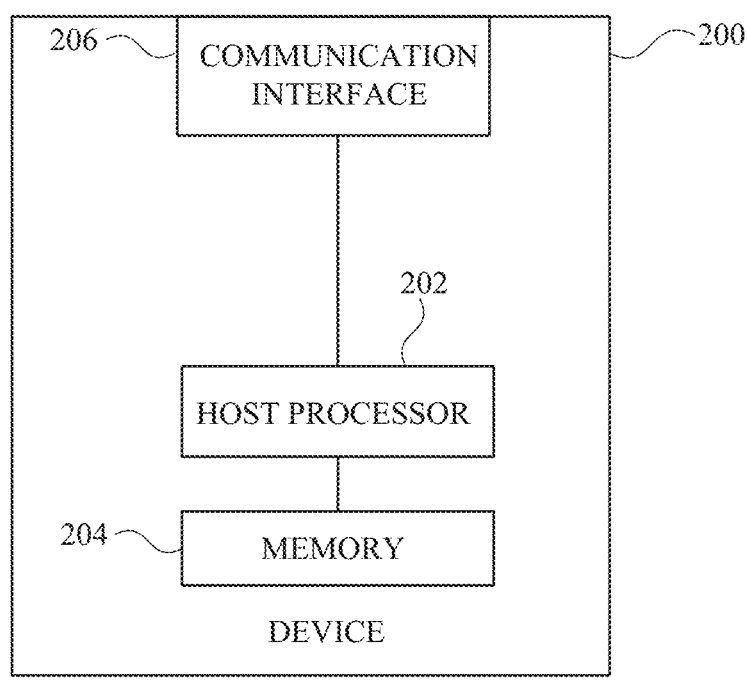
FIG. 2 illustrates an example device that may implement a system for managing device usage time in accordance with one or more implementations.

FIG. 2 illustrates an example device that may implement a system for managing device usage time in accordance with one or more implementations. For example, the device 200 of FIG. 2 can correspond to any of the electronic devices 102-104 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a host processor 202, a memory 204, and a communication interface 206. The host processor 202 may include suitable logic, circuitry, and/or code that enable processing data and/or controlling operations of the device 200. In this regard, the host processor 202 may be enabled to provide control signals to various other components of the device 200. The host processor 202 may also control transfers of data between various portions of the device 200. Additionally, the host processor 202 may enable implementation of an operating system or otherwise execute code to manage operations of the device 200. In the subject system, the host processor 202 may implement software architecture for managing device usage time as discussed further below with respect to FIGS. 3-7.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage. In one or more implementations, the memory 204 may store an application for managing personal device usage time and/or for managing device usage time for another user (e.g., a child).

The communication interface 206 may include suitable logic, circuitry, and/or code that enables wired or wireless communication, such as between any of the electronic devices 102-104 and the server 108 over the network 106. The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the host processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
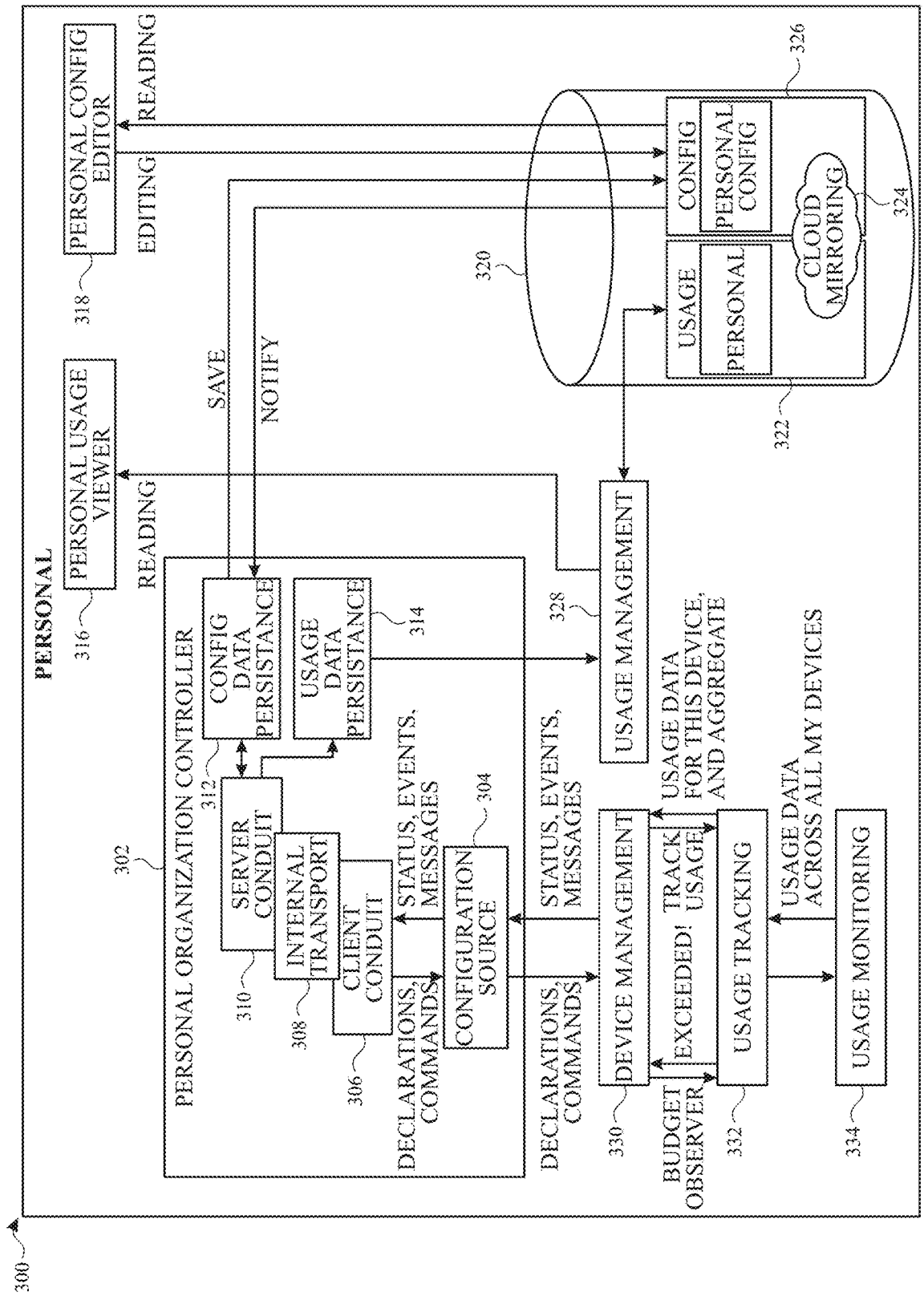
FIG. 3 illustrates an example architecture of a system for managing personal device usage time in accordance with one or more implementations.

FIG. 3 illustrates an example architecture 300 of a system for managing personal device usage time in accordance with one or more implementations. For example, the architecture 300, including its various components 302-334, can be implemented by one or more software modules running on the host processor 202 of the electronic device 102 (e.g., or on any of the electronic devices 102-103). In another example, the architecture 300 can be implemented by one or more software modules implemented by custom hardware (e.g., one or more coprocessors). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The architecture 300 includes a database 320 with a usage database 322 and a configuration database 326. The usage database 322 may store usage data corresponding to usage time, by a user of the electronic device 102, with respect to applications, websites, categories of applications and/or websites and/or device-level functions. The displayed applications, websites, categories of applications and/or websites and/or device-level functions may be pre-selected by the user (e.g., where the user specifies which applications, websites, categories of applications and/or websites and/or device-level functions to display). For example, the displayed applications, websites, categories of applications and/or websites and/or device-level functions may correspond with a registered user account(s) (e.g., a cloud-based, service provider account that provides for usage management), and be pre-selected by the user based on different categories associated with the user account(s) (e.g., work, personal). Alternatively, all applications, websites, categories of applications and/or websites and/or device-level functions associated with usage may be displayed.

The configuration database 326 may store time-based restrictions (e.g., quotas and/or curfews) set by the user of the electronic device 102 (e.g., in association with a registered user account) for one or more applications, websites, categories of applications and/or websites and/or device-level functions. In one or more implementations, the database 320 includes a cloud mirroring component 324, which may be used in synchronizing the usage time and time-based restrictions across multiple devices associated with a user (e.g., the electronic devices 102-103).

The personal configuration editor 318 may provide a user interface for setting and/or adjusting time-based restrictions. The user interface provided by the personal configuration editor 318 may include user interface elements for setting respective (e.g., different) time-based restrictions for applications, websites, categories (e.g., of applications and/or websites) and/or device-level functions.

In this regard, the time-based restrictions may correspond to a quota, where the user specifies via the user interface a fixed amount of time that usage is permitted. Usage time by the user is applied against the quota, to determine when the quota has been reached. Alternatively or in addition, the time-based restrictions may correspond to a curfew, where the user specifies, via the user interface, times during which personal usage is permitted and prohibited. Examples of time-based curfews include, but are not limited to: daily restrictions (e.g., restricted usage from 10 pm-2 am every day), weekly restrictions (e.g., restricted usage for the entirety of, or specified times of a particular day(s) of the week), monthly restrictions (e.g., restricted usage for the entirety of, or specified times of a particular day(s) in a month week), and the like. In addition, time-based curfews may be set on a recurring basis or a single occurrence basis.

In addition, restrictions may be based on quantity (e.g., as opposed to predefined times). For example, restrictions may specify the number of times a particular application, website, category, and/or device-level function may be used. In another example, restrictions can be set to specify the number of times a particular action with respect to an application, website, category and/or device-level function may be performed (e.g., a predefined number of times to receive a notification, send a message, pick up a device, and the like).

In one or more implementations, additional restrictions may be based on geolocation of the electronic device. For example, restrictions for particular device-level functions (e.g., camera, microphone) may be specified based on geo-fencing to a predefined location (e.g., a museum, a movie theater). Geo-based restrictions may also be specified for applications, websites and/or categories (e.g., social networking at a public park). In one or more implementations, geo-based restrictions may be specified with respect to locations associated with the user (e.g., work, school), based on information local to the user's device (e.g., contact address information). However, the identity and/or association of those locations are not provided to the server (e.g., server 108) or otherwise shared, so as to protect user privacy.

In addition, restrictions may be specified with respect to environmental conditions, for example, that relate to the device. For example, in a case where a WiFi connection is not available (e.g., indicating that the device will be required to use cellular data for network-based functions), a user may opt to set restrictions with respect to disabling network activity (e.g., connecting to the internet for applications and/or websites). In another example, in a case where the electronic device 102 detects nearby devices (e.g., via near-field communication, bluetooth) that are not known (e.g., not user contacts), the user may have specified restrictions to disable or otherwise adjust device-level functions (e.g., disabling wireless file transfer, or limiting file transfer to contacts). In another example, the user may specify to disable or otherwise limit device usage based on device power state (e.g., low battery, plugged in, or not plugged in).

Moreover, the user may specify contact-based restrictions for certain contacts of a user (e.g., for personal management) or certain contacts of another user (e.g., for child management). For example, a user may specify not to communicate with particular contacts (e.g., either for personal management, or for a child), or may encourage communication with particular contacts (e.g., as goals/conditions before permitting certain application, website, category and/or device-level functions).

In one or more implementations, the various types of above-mentioned restrictions may be combined so as to form compound restrictions. For example, any two or more of the restrictions (e.g., time, quantity, geolocation, device environment/condition and/or contacts) may be used to form a compound restriction, which is based on the respective restriction(s) for each restriction type. For example, the user may specify a compound restriction to not communicate with a particular contact based on a time-based curfew (e.g., no communicating with person X from 10 pm-2 am). In another example, the user may specify a compound restriction for no social networking between 10 am-2 pm on Sundays if geo-fenced to a public park.

The various restrictions that may be specified by a user, (e.g., restrictions based on time, quantity, geolocation, device environment/condition, contacts), as well as any usage corresponding to those restrictions, may be synchronized across the user's multiple devices and/or across family devices (e.g., for child-based restrictions) in an end-to-end encrypted manner as described herein. In this way, the restriction and/or usage data is only accessible by the devices associated with the user (e.g., and/or children) and not by a server (e.g., server 1018), thereby protecting user privacy.

The user interface provided by the personal configuration editor 318 allows for the user to set the time-based restrictions (e.g., quotas and/or curfews) for particular applications, websites, categories of applications and/or websites, and/or device-level functions. With respect to applications and/or websites, the user may designate respective time-based restrictions for different applications and/or websites. For example, the user may designate a 2 hour quota for a first social networking application, and/or may define a curfew (e.g., no usage from 11 pm-5 am) for a first news website. In one or more implementations, if a time-based restriction is set for a particular application (e.g., the first social networking application), the architecture 300 may automatically apply the same time-based restriction to the website version of the application and/or an extension application version of the application. In a similar manner, time-based restrictions for a particular website may be automatically applied to the application version and/or the extension application version of the website. In doing so, the architecture 300 may determine that the website (e.g., the domain hosting the website) corresponds with the application and/or extension. Moreover, while a website is described herein with respect to managing device time, limiting website usage, and setting time-based restrictions, such managing, limiting, and setting of time-based may apply with respect to the domain hosting the website.

With respect to categories, the user interface provided by the personal configuration editor 318 may provide for the user to designate time-based restrictions (e.g., quotas or curfews) for categories of applications and/or websites. Categories correspond to a logical grouping of applications and/or websites. Examples of categories of include, but are not limited to: books, business, catalogs, education, entertainment, finance, food & drink, games, health & fitness, lifestyle, medical, music, navigation, news, photo & video, productivity, reference, social networking, sports, travel, utilities and weather (e.g., in one or more geographical regions). Thus, a user may designate a time-based quota and/or a time-based curfew for a particular category, for example, social networking. The time-based quota or curfew would apply to applications, websites and/or extension applications (and combinations thereof) that are categorized as social networking applications.

In addition to the above-listed categories, applications and/or websites may be categorized based on one or more broad topics associated with the user, such topics that broadly correlate to the user's interests, e.g., without identifying the user. Thus, a user may designate (e.g., via the user interface provided by the personal configuration editor 318) a time-based quota and/or a time-based curfew for a particular topic, for example, sports. The time-based quota or curfew would apply to content within applications, websites and/or extension applications (and combinations thereof) that are categorized as sports.

In one or more implementations, the categorizing of applications and/or websites may be based on default information provided by the application/website developer (e.g., as part of installation for an application, or as part of default website information). Alternatively or in addition, the categorizing of applications and/or websites may be specified by the user (e.g., user categorization of applications on a device, user-defined bookmarks).

The user interface provided by the personal configuration editor 318 may further allow the user to designate time-based restrictions (e.g., quotas or curfews) for device-level functions. For example, device-level functions may relate to one or more of overall device usage and/or usage of particular device functions (e.g., display, audio, microphone, camera, sensors, accessories and/or hardware resources). Thus, a user may designate a time-based quota for a particular device-level function, for example, total audio time (e.g., 3 hours total per day), or an audio-based curfew (e.g., no audio after 11 pm). The time-based quota and/or curfew would thus apply to audio output. In addition to a quota or curfew, the user interface can provide for restricting the number of times that content (e.g., audio or music video) is consumed. In addition, different restrictions can be set for different hardware components (e.g., earphones for 1 hour, phone speakers for 2 hours).

In implementing time-based restrictions for device-level functions, a device level framework may be employed. For example, a module may be implemented that provides permission, for each application, to use the corresponding device-level function (e.g., audio, video). In this regard, the module may provide for device-level functionality based on limited ranges of use. For example, an audio module may define output levels (e.g., maximum and minimum volume levels), rather than simply turning audio on/off when a time-based restriction is reached based on usage time. In one or more implementations, device-level functions may be grouped with applications and/or web sites, such that time-based restrictions and usage of the device-level functions are based on the respective applications and/or websites (e.g., setting a time-based restriction for video/audio functionality of a music application).

After a user sets time-based restrictions via the user interface, those time-based restrictions may be written to the configuration database 326. In addition, the personal configuration editor 318 may access the configuration database 326 to display currently set time-based restrictions for the user, and/or to update the configuration database 326 based on adjustments to the time-based restrictions entered by the user via the user interface.

The architecture 300 further includes a personal usage viewer 316 which is coupled to a usage management module 328 and which may provide a user interface for viewing usage time. For example, the user interface as provided by the personal usage viewer 316 may show respective usage times for one or more of: overall device usage time, application(s) (e.g., on a per-application basis), websites (e.g., on a per-website basis), device-level functions (e.g., on a per-function basis) and/or categories of applications/websites (e.g., on a per category basis). The user interface provided by the personal usage viewer 316 may display usage relative to their respective time-based restrictions (e.g., based on the configuration database 326).

For example, usage time for an application, website, device-level function and/or category may be displayed as a usage percentage relative to a time-based quota (e.g., in graph and/or text format). In one or more implementations, the user interface provided by the personal usage viewer 316 may also display summary information, such as but not limited to, applications, websites and/or categories ranked by usage time (e.g., social network application A for 3 hours, website B for 2 hours). As such, the user may be made aware of which applications and categories he/she is using most, and the user may set time-based restrictions accordingly.

As the user continues to use the electronic device 102 (e.g., by using applications, websites and/or device level functions), that usage time is updated within the database 320 (e.g., as part of usage database 322), and the user interface provided by the personal usage viewer 316 may change to show the updated usage time. In one more implementations, usage time is based on when a respective application or website is front-most on the electronic device. Moreover, usage time may be determined based on whether the user is interacting with application/web content or passively consuming the content. For example, the subject system may determine that usage time does not apply (e.g., count against a quota) for passive consumption of a game (e.g., the game is paused and/or the user is not interacting with the game) or a social network (e.g., no user interaction, but social network is still front-most). However, usage time may be applied for passive consumption of media content (e.g., video or music content which may not typically require user interaction to be consumed).

The user interface provided by the personal usage viewer 316 may be displayed as part of, or separate from, the user interface provided by the personal configuration editor 318. Thus, the user interface(s) provided by the personal usage viewer 316 and the personal configuration editor 318 provide for the user to set time-based restrictions (e.g., for categories, applications, websites and/or device-level functions), view current usage times relative to the time-based restrictions, modify time-based restrictions, and otherwise manage his/her usage time.

The architecture 300 further includes a personal organization controller 302, a device management module 330, a usage tracking module 332, a usage monitoring module 334, and the usage management module 328, which may work in conjunction with each other to track usage time (e.g., across multiple devices) relative to the time-based restrictions set by the user.

In one or more implementations, the configuration data persistence module 312 may access the configuration database 326 to obtain configuration data corresponding to the time-based restrictions. The configuration data persistence module 312 may pass the configuration data through a server conduit 310, an internal transport 308, a client conduit 306, and a configuration source module 304. The configuration source module 304 may then pass rules (e.g., declarations, commands) based on the configuration data to the device management module 330. Thus, the personal organization controller 302 is configured to detect changes made to the time-based restrictions (e.g., via the configuration data persistence module 312), and to communicate these detected changes to the device management module 330.

In addition to receiving the time-based restrictions, the device management module 330 may be configured to access usage data across multiple devices of the user. In this regard, the usage monitoring module 334 may be configured to synchronize user activity data across multiple devices, without aggregating the user activity on a server (e.g., the server 108). In this manner, the user's privacy may be maintained while the user is provided the benefit of having their prior activity on any of their electronic devices.

The architecture 300 provides for maintaining privacy of the time-based restrictions and of the usage data, so that only the authorized devices (e.g., the electronic devices 102-103) may access the usage data. For example, data indicating usage and/or restrictions may be end-to-end encrypted when communicated between the electronic devices 102-103. For example, the privacy may be implemented by storing the usage data on a server (e.g., the server 108), where the usage data is only accessible by devices with encryption keys, e.g., keys that are not available at the server. Alternatively or in addition, the restriction and/or personal usage data may be synchronized across multiple devices of the user using a device-to-device communication protocol. Based on these privacy implementations, access of the restriction data and/or usage data by unauthorized devices (e.g., including the server 108) may be prevented.

In one or more implementations, the usage tracking module 332 may implement de-duping of device usage. The usage tracking module 332 may receive the synchronized usage data from the usage monitoring module 334 and aggregate (e.g., de-dupe) that data with any local usage data. In this regard, in a case where the user is simultaneously using two devices (e.g., in association with a registered user account), the usage tracking module 332 may perform de-duping such that the simultaneous usage time across multiple devices is not counted twice. Simultaneous usage can be detected, for example, based on timestamp data of when respective applications were front-most on their respective electronic devices. With respect to websites, timestamp data for domain usage may be used to determine when the website was accessed.

The usage tracking module 332 may determine that simultaneous usage of the same application (e.g., or category) across different devices should not be multiply (e.g., doubly) counted against the time-based quota. However, if each device is using a different application (e.g., or category), then the budget may be applied in full to the respective time-based restriction for each application/category. If a time-based restriction is set for overall device usage in addition to specific application-based restrictions, the de-duping may not count the separate device usages in double. In this manner, if the user uses multiple different applications across multiple devices for 24 hours straight, it could be possible for the overall device usage to be determined by the subject system as 24 hours, while the total summation of hours for each the individual applications may exceed 24 hours.

In one or more implementations, the de-duping may be implemented at the application level and/or the category level. For example, if the user is simultaneously accessing a first social network application on the electronic device 102 and a second social network application on the electronic device 103, the usage tracking module 332 may determine that usage of the different applications within the same category of social networking should not be doubly counted against a time-based quota for the category of social networking.

The timing of synchronization for user device(s) may be based on a synchronization policy. For example, if the user is only associated with a single electronic device (e.g., the electronic device 102), the synchronization policy may specify to synchronize at an infrequent cadence (e.g., once a week or longer), or not synchronize at all. If the user is associated with multiple electronic devices (e.g., the electronic devices 102-103), the synchronization policy may specify to perform synchronization on a more frequent basis (e.g., once an hour). If the user is associated with multiple electronic devices and has set time-based restrictions for usage time, the synchronization policy may specify to perform synchronization even more frequently (e.g., once every half hour). In addition, if usage time by the user approaches the time-based restriction (e.g., the difference between aggregated usage time and a time-based quota is below a predefined value), the synchronization policy may specify to perform synchronization even more frequently (e.g., once every 10 minutes). Moreover, if the user is determined to be accessing the user interface(s) provided by the personal usage viewer 316 and/or the personal configuration editor 318 (e.g., suggesting that the user is viewing usage and/or adjusting time-based restrictions), the synchronization policy may specify to perform an immediate synchronization, or to otherwise synchronize as soon as the device(s) are available to synchronize.

As noted above, the synchronization of usage time between multiple devices of the user may be effected by storing encrypted data representative of the usage time on a server, where the multiple devices have respective keys to access the encrypted data and the respective keys are not accessible to the server. Alternatively or in addition, the synchronization policy in some cases may specify for device-to-device synchronization between the multiple devices.

For example, if usage time by the user approaches the time-based restriction (e.g., based on a meeting a predefined difference between the two values), the synchronization policy may specify to perform device-to-device synchronization with any nearby and already-awake devices (e.g., the electronic device 103). For example, the device-to-device synchronization may be performed using protocols for nearby communication, including but not limited to Bluetooth, near-field communication (NFC), Wi-Fi, and the like. However, the synchronization policy may not necessarily provide for waking up nearby devices that are not awake.

On the other hand, in a case where the user is determined to be accessing the user interface(s) provided by the personal usage viewer 316 and/or the personal configuration editor 318 on the electronic device 102 (e.g., suggesting that the user is currently viewing usage and/or adjusting time-based restrictions), the synchronization policy may specify to wake up all nearby devices associated with the user, and perform device-to-device synchronization with those devices. In one or more implementations, the device-to-device synchronization may be associated with less power usage and/or have less latency relative to server-based synchronization. In addition, even in a case where device-to-device synchronization is performed (e.g., every 10 minutes), the synchronization policy may still specify for corresponding server-based synchronizations to be performed (e.g., every hour).

With respect to monitoring usage time by the user, the device management module 330 may provide status, event or message data related to usage time to the configuration source module 304 (e.g., in association with a registered user account). The configuration source module 304 may pass this data to the client conduit 306, the internal transport 308, the server conduit 310 and the usage data persistence module 314. The usage data persistence module 314 may store data record(s) indicating the respective usage time(s) by the user for applications, websites, categories and/or device-level functions, and store those records in the usage database 322. In this manner, usage data across multiple devices of the user may be maintained. The user may view usage time information, for example, by invoking the interface(s) provided by the personal organization controller 302 and the personal configuration editor 318.

In one or more implementations, the client conduit 306, the internal transport 308 and the server conduit 310 may be configured such to handle different sources of usage data (e.g., personal usage as discussed with respect to architecture 300, another user's data as discussed below with respect to FIGS. 4-5, and/or usage data within an enterprise as discussed below with respect to FIG. 6). For example, the client conduit 306, the internal transport 308 and the server conduit 310 may provide for scaling and flexibility with respect to the different sources of usage data. The different sources of data are discussed further below with respect to FIG. 7.

Moreover, the device management module 330 in conjunction with the usage tracking module 332 may be configured to detect when a violation of a time-based restriction occurs. As noted above, the device management module 330 and the usage tracking module 332 may have access to the aggregated (de-duped) usage data for multiple devices of the user, and may also have access to the time-based restrictions (e.g., as received from the configuration source module 304). The device management module 330 and the usage tracking module 332 are configured to apply the time-based restrictions based on the aggregated usage time, in order to detect when a violation of the time-based restriction occurs in view of the aggregated usage time. For example, a violation may be detected when usage time exceeds a quota, or when usage time is not within a curfew. If a violation is detected, the device management module 330 may facilitate in providing a notification of a violation and/or prohibit further use of the application, website, category, or device-level function.

With respect to notifications, the device management module 330 may provide for the electronic device 102 to display a notification indicating the personal usage time for the respective application, website or category has been reached. The notification may include an interface element for directing the user to the user interface provided by the personal configuration editor 318. In this manner, the user may modify the time-based restriction in response to the notification, for example, by increasing the quota or adjusting the curfew time range.

In response to a violation, the device management module 330 may further provide for preventing the user from accessing the respective applications (or extension applications), websites, categories and/or device level functions. For example, the device management module 330 may block access to the corresponding application (or extensions), websites or device-level functions. In doing so, the device management module 330 may provide for displaying an icon (e.g., an overlay such as a shield icon) that visually indicates that access is not permitted. In one or more implementations, the blocking and/or icon may be implemented for multiple entry points to an application or website (e.g., a shield is overlaid on the application launching interface, URL launching interface, extension launching interface). In this manner, the icon (e.g., shield) may follow the application, website, category and/or device-level function across the operating systems of the multiple devices of the user. In one or more implementations, the icon may be displayed together with a user interface element for unblocking the application, website, category and/or device-level function (e.g., by directing the user to the user interface provided by the personal configuration editor 318).

In one or more implementations, exceptions for blocking may apply to a predefined set of applications, websites and/or time-based restrictions, even if in violation of a time-based restriction. For example, if a user specifies a time-based restriction for overall device usage, applications within the predefined set (e.g., system applications such as the phone, alarm clock, maps and the like) may continue to be available to the user and not be blocked. The predefined set of applications may be user-selectable, such that the user can specify which applications, websites and/or device-level functions (e.g., associated with a category) should not be blocked, even if in the usage time violates the corresponding time-based restriction.

In one or more implementations, the usage monitoring module 334 may detect user deletion of an application. The electronic device 102 may remove local data that identifies the application (e.g., removing application IDs, launch event information, and the like). However, the personal organization controller 302 may modify or otherwise maintain a record of usage time (e.g., interval/duration) of the category corresponding to the application.

Alternatively or in addition, the usage monitoring module 334 may detect user deletion of browser history corresponding to a website. The electronic device 102 may remove local data that identifies the browser history corresponding to the website (e.g., removing domain name data). However, the personal organization controller 302 may modify or otherwise maintain a record of usage time (e.g., interval/duration) of the category corresponding to the website.

In one or more implementations, it is possible for a particular device to be associated with multiple users. For example, the electronic device 104 (e.g., illustrated as a laptop) may be shared by multiple users, where each user has a respective user account (e.g., a cloud-based, service provider account that provides for usage management). Thus, in a case where a first user logs into his/her respective cloud-based account using the electronic device 104, the architecture 300 may provide for managing personal device usage time for that first user. Moreover, if a second user were to subsequently log into his/her cloud-based account using the electronic device 104, the architecture 300 may provide for managing personal device usage time for that second user.

Alternatively or in addition, the electronic device 104 may provide for localized management of personal device usage time, for example, in a case where a user does not log into his/her cloud-based account using the electronic device 104. For example, the electronic device 104 may implement software configured to manage one or more local user accounts for local management of personal usage time. Thus, if a third user were simply to use the device (e.g., by logging into the device but not logging into his/her cloud-based account), he/she could set restrictions local to the device. For example, restrictions may be set for applications, categories of applications, device-level functions and general web browser usage with respect to local usage on the electronic device 104 (e.g., and not across multiple devices and/or specific on-line usage). In one or more implementations, the software for local usage management may provide for parents to set restrictions for their children, based on user accounts/profiles local to the electronic device 104 (e.g., where the child logs into the device, but not into his/her cloud-based account). Usage data may be tracked locally with respect to local restrictions. In addition, corresponding notices, usage statistics, interfaces, blocking of applications, categories and/or device-level functions, requests for budget increases and the like may apply as described herein, but limited to local device usage.

In one or more implementations, one or more of the components 302-334 of the architecture 300 are implemented via software instructions, stored in the memory 204, which when executed by the host processor 202, cause the host processor 202 to perform particular function(s).

In one or more implementations, one or more of the components 302-334 of the architecture 300 may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
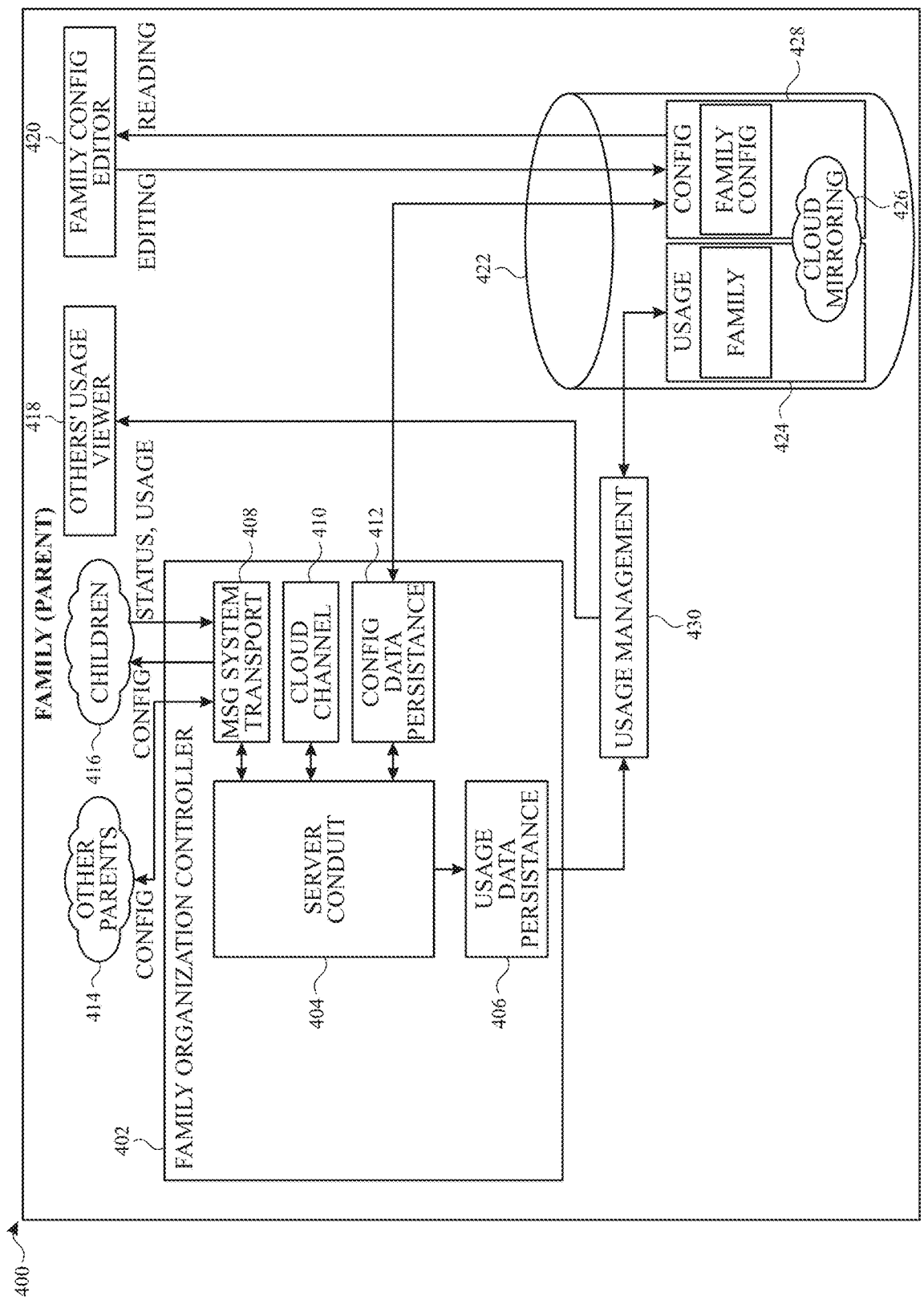
FIG. 4 illustrates an example architecture of a system for managing device usage time of another user in accordance with one or more implementations.

FIG. 4 illustrates an example architecture of a system for managing device usage time of another user in accordance with one or more implementations. For example, the architecture 400, including its various components 402-430, can be implemented by one or more software modules running on the host processor 202 of the electronic device 104, for managing device usage time of another user with respect to the electronic devices 102-103. In another example, the architecture 400 can be implemented by one or more software modules implemented by custom hardware (e.g., one or more coprocessors). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In one or more implementations, at least a portion of the architecture 400 may be implemented on a parent's electronic device 104, for managing device usage for a child's electronic devices 102-103. The architecture 400 is not limited to a parent managing device usage of a child, and can apply to other scenarios in which a user manages device usage for another user. Thus, while the architecture 400 is described with respect to "parent" user (e.g., of the electronic device 104) and a "child" user (e.g., of the electronic devices 102-103), the architecture may generally apply to any two users.

In one or more implementations, parent-children relationships may be predefined, for example, by a system which defines roles for parents and children. The roles may be defined based on configuration data set by the parent user. For example, the roles of parents and children may be defined by registered user accounts of the parents and children, where the respective user accounts indicate the parent-child relationship. In this regard, devices associated with the registered accounts of the parent(s) and/or children (e.g., based on login to the registered accounts) may be grouped and determined to correspond with a family unit (e.g., as part of a circle of trust, or trusted group of devices). As described herein, the devices may access encrypted usage data and/or time-based restriction data via a key that is only accessible by the trusted devices. In one or more implementations, in a case where a trusted device is removed from the group, key(s) may be regenerated for the remaining trusted devices.

The architecture 400 includes a database 422 with a usage database 424 and a configuration database 428. The usage database 424 may store usage data corresponding to usage time, by a child user of the electronic devices 102-103, with respect to applications, websites, categories of applications and/or websites and/or device-level functions. In addition, the configuration database 428 may store time-based restrictions (e.g., quotas and/or curfews) set by the parent user of the electronic device 104. The time-based restrictions apply to the child user of the electronic devices 102-103, for the respective applications, websites, categories of applications and/or websites and/or device-level functions. In one or more implementations, the database 422 includes a cloud mirroring component 426, which may be used in synchronizing the usage time and time-based restrictions across multiple devices associated with both the parent and the child (e.g., the electronic devices 102-104).

The family configuration editor 420 may provide a user interface for setting and/or adjusting time-based restrictions. The user interface provided by the family configuration editor 420 may include user interface elements for setting respective (e.g., different) time-based restrictions. The time-based restrictions may correspond to quota(s) or curfew(s), for example, as discussed above with respect to FIG. 3, but with respect to the child user. In addition, the family configuration editor 420 may provide for other types of restrictions (e.g., restrictions based on time, quantity, geo-location, device environment/condition, contacts) as well as compound restrictions, as discussed above with respect to FIG. 3, but with respect to the child user. In addition, the family configuration editor 420 may include user interface elements for setting the (e.g., time-based) restrictions for user-selected applications, websites, categories (e.g., of applications and/or websites) and/or device-level functions, for example, as discussed above with respect to FIG. 3, but with respect to the child user. In one or more implementations, the user interface provided by the family configuration editor 420 may include user interface elements for setting goals in conjunction with time-based restrictions, such that child user may be required to perform a first time-based goal (e.g., 1 hour of educational reading on the device) before being permitted to access other applications, websites, categories and/or device-level functions.

The architecture 400 further includes an others' usage viewer 418, which communicates with the usage management module 430, and which may provide a user interface for the parent to view usage time by the child user. For example, the user interface as provided by the others' usage viewer 418 may show respective usage times for one or more of: overall device usage time, application(s) (e.g., on a per-application basis), websites (e.g., on a per-website basis), device-level functions (e.g., on a per-function basis) and/or categories of applications/websites (e.g., on a per category basis), as discussed above with respect to FIG. 3, but with respect to the child user. In addition, the user interface provided by the others' usage viewer 418 may display usage relative to respective time-based restrictions (e.g., based on the configuration database 428) as discussed above with respect to FIG. 3, but with respect to the child user.

The architecture 400 further includes a family organization controller 402, which in turn includes a server conduit 404, a message ("MSG") system transport module 408, a cloud channel 410, a configuration data persistence module 412, and a usage data persistence module 406. The configuration data persistence module 412 may access the configuration database 428 to obtain configuration data corresponding to the time-based restrictions, for example, as discussed above with respect to FIG. 3. The usage data persistence module 406 may store data record(s) indicating the respective usage time(s) by the child for applications, websites, categories and/or device-level functions, and store those records in the usage database 424, for example, as discussed above with respect to FIG. 3.

The MSG system transport module 408 may correspond to a transport module configured to communicate usage via messages (e.g., device-to-device messages). As such, the MSG system transport module 408 may provide for the child's usage data associated with the electronic devices 102-103 to be synchronized and accessible by parent via the electronic device 104. Thus, when there is a change to usage time based on usage activity by the child, the MSG system transport module 408 in conjunction with the children module 416, provides for synchronizing those changes to the parent's device (e.g., the electronic device 104). In one or more implementations, the MSG system transport module 408, in conjunction with the MSG system transport module 508 (discussed below with respect to FIG. 5), may provide for sending of end-to-end encrypted messages between the parent and child's devices.

Moreover, the MSG system transport module 408 in conjunction with the other parents module 414, provides for synchronizing those changes to other electronic device(s) (not shown) of a second parent. In one or more implementations, the architecture 400 may also be implemented on the electronic device(s) of the second parent, so that the second parent can view usage time of the child, and make changes to the time-based restrictions for the child. Other parents module 414 is configured to synchronize changes with respect to child usage time and/or time-based restrictions (e.g., as set by either parent).

In one or more implementations, one or more of the components 402-430 of the architecture 400 are implemented via software instructions, stored in the memory 204, which when executed by the host processor 202, cause the host processor 202 to perform particular function(s).

In one or more implementations, one or more of the components 402-430 of the architecture 400 may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 5:
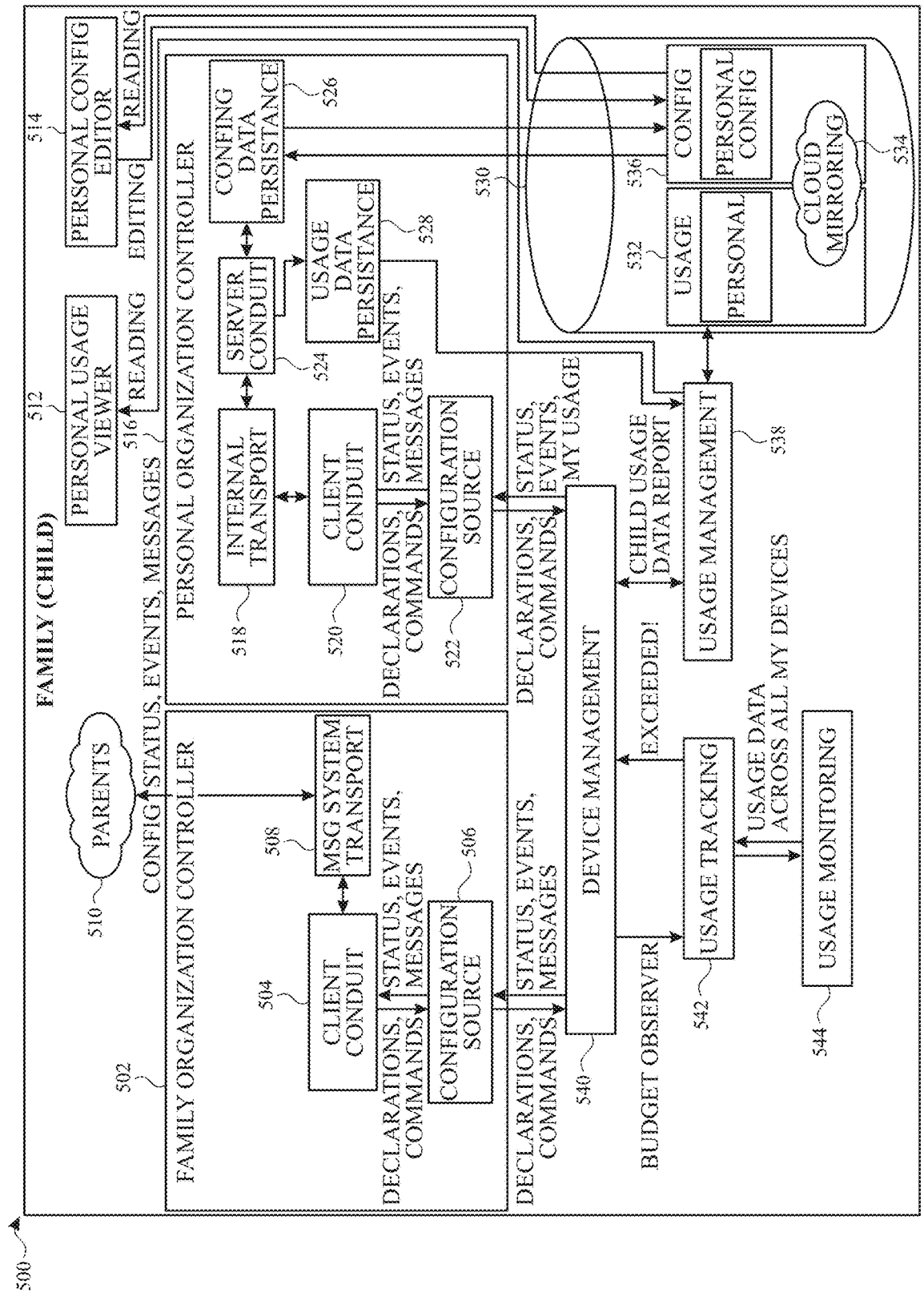
FIG. 5 illustrates an example architecture of a system for managing personal device usage time based on time-based restrictions set by another user in accordance with one or more implementations.

FIG. 5 illustrates an example architecture of a system for managing personal device usage time based on time-based restrictions set by another user in accordance with one or more implementations. For example, the architecture 500, including its various components 502-544, can be implemented by one or more software modules running on the host processor 202 of the electronic device 102 (e.g., or the electronic device 103). In another example, the architecture 500 can be implemented by one or more software modules implemented by custom hardware (e.g., one or more coprocessors). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In one or more implementations, at least a portion of the architecture 500 may be implemented on a child's electronic device 102, for personally managing device usage time, in view of any time-based restrictions set by a parent via the electronic device 104, as described above with respect to FIG. 4. However, the architecture 500 is not limited to a child's device usage, and can apply to other scenarios in which a user's usage time is managed by another user. Thus, while the architecture 500 is described with respect to "child" user (e.g., of the electronic devices 102-103) and a "parent" user (e.g., of the electronic device 104), the architecture may generally apply to any two users.

The architecture 500 includes a database 530 with a usage database 532 and a configuration database 536. The usage database 532 may store usage data corresponding to usage time, by a child user of the electronic devices 102-103, with respect to applications, websites, categories of applications and/or websites and/or device-level functions. In addition, the configuration database 536 may store time-based restrictions (e.g., quotas and/or curfews) set by the parent user of the electronic device 102. The time-based restrictions apply to the child user of the electronic devices 102-103, for respective applications, websites, categories of applications and/or websites and/or device-level functions. In one or more implementations, the database 530 includes a cloud mirroring component 534, which may be used in synchronizing the usage time and time-based restrictions across multiple devices associated with both the parent and the child (e.g., the electronic devices 102-104).

The personal configuration editor 514 may provide a user interface for setting and/or adjusting time-based restrictions. The user interface provided by the personal configuration editor 514 may include user interface elements for setting respective (e.g., different) time-based restrictions. The time-based restrictions may correspond to setting personal quota(s) or curfew(s), for example, as discussed above with respect to FIG. 3. In addition, personal configuration editor 514 may provide for other types of restrictions (e.g., restrictions based on time, quantity, geolocation, device environment/condition, contacts) as well as compound restrictions, as discussed above with respect to FIG. 3. In addition, the personal configuration editor 514 may include user interface elements for setting the personal (e.g., time-based) restrictions with respect to selected applications, websites, categories (e.g., of applications and/or websites) and/or device-level functions, for example, as discussed above with respect to FIG. 3.

In this regard, the personal configuration editor 514 may be used by the child user, in view of time-based restrictions set by the parent user via the electronic device 104. For example, the user interface provided by the personal configuration editor 514 may display current time-based restrictions (e.g., as set by the parent), and allow the child user to make those time-based restrictions more restrictive. For example, if the parent were to set a time-based quota of 2 hours for an application, website and/or category, the child user could see that time-based restriction via the user interface provided by the personal configuration editor 514. The child could modify that time-based restriction, via the user interface provided by the personal configuration editor 514, to be more restrictive, for example, by changing the 2 hour quota to 1 hour. Such a change would be reflected in the configuration database 536, and synchronized with the parent's electronic device 104 (e.g., via the MSG transport system 508 and parents module 510 as discussed later). However, the time-based restriction set by the parent may not be less restrictive than time-based restriction(s) set by the child. In other words, the parent restriction(s) may trump those of the child if the child attempts to set less restrictive restriction(s).

The architecture 500 further includes a personal usage viewer 512, which may provide a user interface for viewing personal usage time. For example, the user interface as provided by the personal usage viewer 512 may show respective usage times for one or more of: overall device usage time, application(s) (e.g., on a per-application basis), websites (e.g., on a per-website basis), device-level functions (e.g., on a per-function basis) and/or categories of applications/websites (e.g., on a per category basis), as discussed above with respect to FIG. 3. In addition, the user interface provided by the personal usage viewer 512 may display usage relative to respective time-based restrictions (e.g., based on the configuration database 536) as discussed above with respect to FIG. 3.

The architecture 500 further includes a personal organization controller 516, which in turn includes a configuration data persistence module 526, a usage data persistence module 528, a server conduit 524, an internal transport module 518, a client conduit 520 and a configuration source 522. The configuration data persistence module 526 may access the configuration database 536 to obtain configuration data corresponding to the time-based restrictions, for example, as discussed above with respect to FIG. 3. The usage data persistence module 528 may store data record(s) indicating the respective usage time(s) by the child for applications, websites, categories and/or device-level functions, and store those records in the usage database 532, for example, as discussed above with respect to FIG. 3.

The configuration data persistence module 526 may pass the configuration data (e.g., corresponding to time-based restrictions set by the parent and/or the child) through the server conduit 524, the internal transport module 518, the client conduit 520, a configuration source 522, the usage management module 538, and the device management module 540, for example, as discussed above with respect to FIG. 3. Moreover, the device management module 540, in conjunction with the usage tracking module 542 and the usage monitoring module 544, may: access and aggregate (de-dupe) usage data across multiple devices of the user for applications, websites, categories and/or device level functions; maintain privacy of the user across his/her multiple devices (e.g., the electronic devices 102-103); aggregate usage data; synchronize data between the child's multiple devices based on a synchronization policy (e.g., using cloud-based synchronization and/or device-to-device synchronization); detect time-based violations; notify and/or block respective applications, websites, categories and/or device-level functions (e.g., with predefined exceptions); and account for deletion of applications and/or websites (e.g., by removing identifying data while maintaining an abstracted record of usage data), as discussed above with respect to FIG. 3.

Moreover, the architecture 500 includes a family organization controller 502, which in turn includes the MSG system transport module 508, a client conduit 504 and configuration source module 506. The MSG system transport module 508 provides for the child's usage data associated with the electronic devices 102-103 to be synchronized and accessible by the parent on the electronic device 102 via the parents module 510. Thus, when there is a change to usage time based on usage activity by the child, the MSG system transport module 508 via the parents module 510 and in conjunction with the MSG system transport module 408, provides for synchronizing those changes to the parent's device (e.g., the electronic device 102).

The MSG system transport module 508, in conjunction with the MSG system transport module 408, may provide for sending of end-to-end encrypted messages between the parent and child's devices, where the messages indicate the time-based restrictions and/or usage time associated with the child. Moreover, in response to the device management module 540 detecting violation of a time-based restriction (in conjunction with the usage tracking module 542 and the usage monitoring module 544), the child's device may notify the parent of the violation via the MSG system transport module 508.

As noted above, the parent may set time-based goals for a child (e.g., one hour of reading is required before other device activity). Thus, the device management module 540 may be configured to detect that the time-based goal is reached before permitting the child to use other applications, websites, categories and/or device-level functions.

In one or more implementations, aspects of the above-mentioned synchronization policy discussed above with respect to FIG. 3 may also apply to synchronization between the child and parent's devices. For example, synchronization frequency may be increased in a case where: the child has multiple electronic devices instead of a single device; the child is subject to time-based restrictions (e.g., quotas); the child's usage time is approaching time-based restrictions (e.g., quotas); and/or user interaction is detected with respect to viewing usage time and/or adjusting time-based restrictions. The type of synchronization may be based on message transport (e.g., via the MSG system transport module 508). Alternatively or in addition, synchronization between the child and parent's devices may be server-based.

In this regard, a server (e.g., the server 108) may store the restriction and/or usage data in an encrypted manner, where the parent and child's devices are provided with access to the data based on respective keys that are not accessible to the server. Moreover, the server may store usage data with respect to the domain hosting the website (e.g., the domain "xyz.com"), but not the particular website and/or its corresponding webpages (e.g., xyz.com/123). In example embodiments, the server-based sharing mechanism may be implemented by one or more encrypted data containers which are only accessible by the child's device (e.g., the electronic devices 102-103) and the parent's device (e.g., the electronic device 104). For example, the encrypted data containers may be logical containers for storing encrypted data corresponding to different user accounts (e.g., one or more logical containers associated with the parent and/or child user accounts). Access to the logical containers (e.g., with respect to restriction and/or usage data) is limited to devices registered to the parent and/or child, and accessible via respective keys stored on the registered devices. In this regard, the server 108 would not have access to the encrypted data (e.g., for usage and/or time-based restrictions) stored on the containers. By virtue of storing the encrypted data on the server, the child's device may access the time-based restrictions, even if the parents' device(s) are offline. In addition, the parent's device may be used to set the restrictions when the child's device is offline. Moreover, while the message transport system may implement a time-to-live (TTL) for messages related to usage time and/or time-based restrictions, the TTL may not apply in the server-based implementation.

In one or more implementations, a child user may request the parent for an increased budget with respect to time-based restrictions. If the time-based restriction corresponds to a quota, the child's device may present a user interface for requesting an increased quota. If the time-based restriction corresponds to a curfew, the child's device may present a user interface for requesting an extended time range for usage. These interfaces for requesting increased budget may invoked by the child user via the interface provided by the personal configuration editor 514. Alternatively or in addition, the interface for requesting increased budget may be automatically invoked upon detection (e.g., by the device management module 540 and the usage tracking module 542) that a time-based violation has occurred. The interface may also be invoked upon detection that the time-based violation is about to occur, for example, if usage time is approaching the time-based restriction.

In response to a child requesting increased budget, the parent's device may be provided with a corresponding request to increase budget. In response, the parent user may increase the budget for the child (e.g., via the user interface provided by the family configuration editor 420).

Alternatively or in addition, the child budget may be increased directly on the child's device itself (e.g., the electronic device 102-103) by inputting a restriction code which allows the user (e.g., parent) to increase the budget.

In one or more implementations, an application subject to a time-based restriction on the child's device may not be present (e.g., not installed) on the parent's device. To provide visual context of such an application, the parent device may be configured to obtain an icon representing the application from a public data source, such as a public endpoint associated with an on-line application store. Thus, the parent's device (e.g., the electronic device 104) is not required to provide any identifying information in order to obtain the icon. For example, the electronic device 104 may access an application catalog associated with public data source to retrieve the name and/or icon of the application, without providing any identifying information. In this manner, a parent's and/or child's device privacy is protected, for example, as no information is revealed about the child identity or the parent identity. The icon may be displayed, for example, within the user interface provided by the family configuration editor 420, within a notification provided to the parent user when a time-based violation occurs, within a notification request from the child's device for increasing budget for a time-based violation.

In one or more implementations, one or more of the components 502-544 of the architecture 500 are implemented via software instructions, stored in the memory 204, which when executed by the host processor 202, cause the host processor 202 to perform particular function(s).

In one or more implementations, one or more of the components 502-544 of the architecture 500 may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 6:
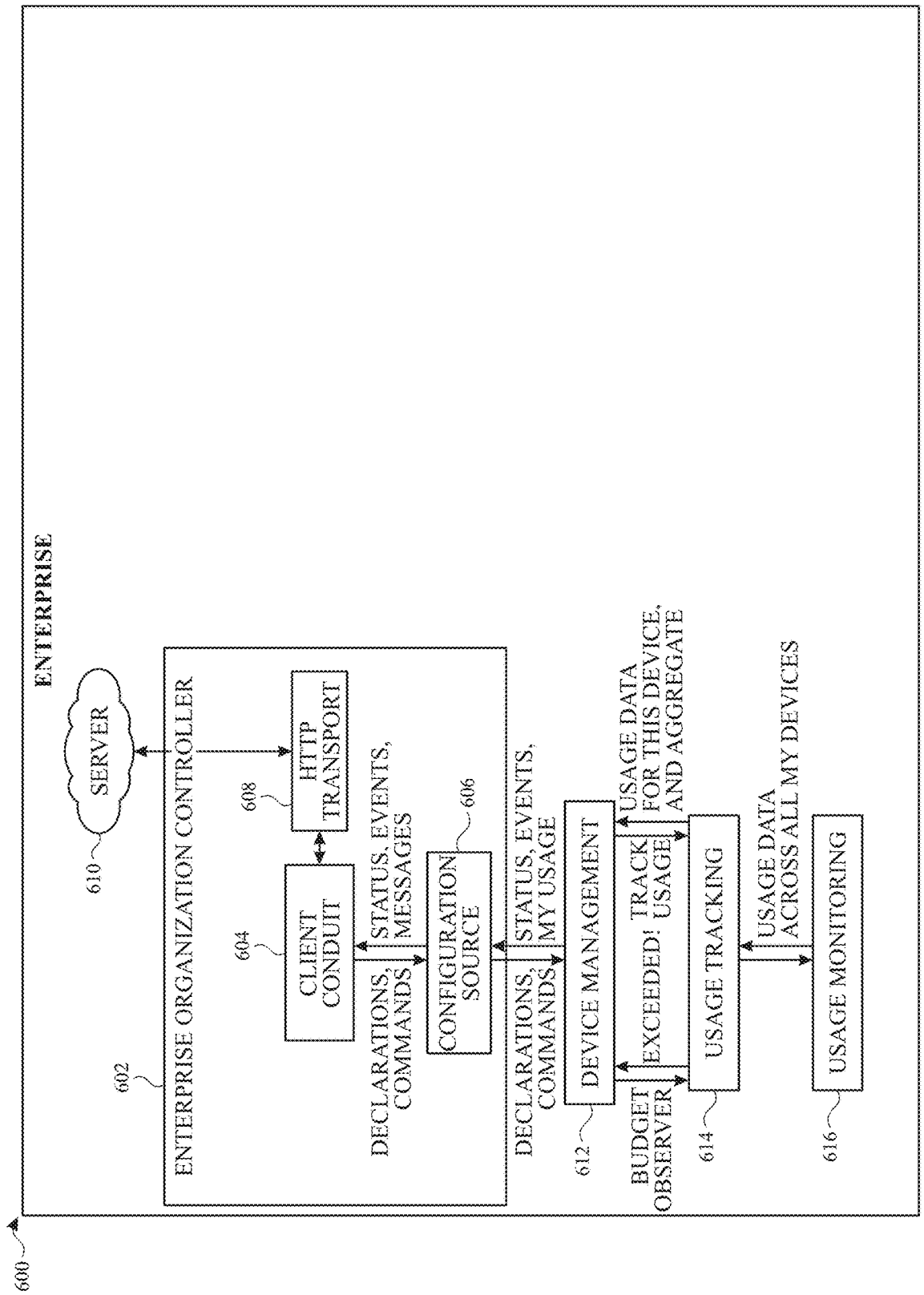
FIG. 6 illustrates an example architecture of a system for managing device usage time in an enterprise setting in accordance with one or more implementations.

FIG. 6 illustrates an example architecture of a system for managing device usage time in an enterprise setting in accordance with one or more implementations. For example, the architecture 600 can be implemented by one or more software modules running on the host processor 202 of any of the electronic devices 102-104. In another example, the architecture 600 can be implemented by one or more software modules implemented by custom hardware (e.g., one or more coprocessors). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The architecture 600 includes an enterprise organization controller 602, which includes a client conduit 604, a configuration source module 606 and a Hypertext Transfer Protocol (HTTP) transport module 608. The architecture 600 further includes a device management module 612, a usage tracking module 614 and a usage monitoring module 616. The component 602-616 may implement functions similar to those described above with respect to FIGS. 3-5, but within the context of an enterprise. Examples of enterprises include, but are not limited to, businesses, schools, entrepreneurships, social enterprises and/or other types of organizations. In this regard, the enterprise organization controller 602 may be configured to manage set restrictions (e.g., based on time, quantity, geolocation, device environment/condition, contacts, and/or compound restrictions) to devices within the enterprise via the HTTP transport module 608 and the server module 610.

In one or more implementations, one or more of the components 602-616 of the architecture 600 are implemented via software instructions, stored in the memory 204, which when executed by the host processor 202, cause the host processor 202 to perform particular function(s).

In one or more implementations, one or more of the components 602-616 of the architecture 600 may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 7:
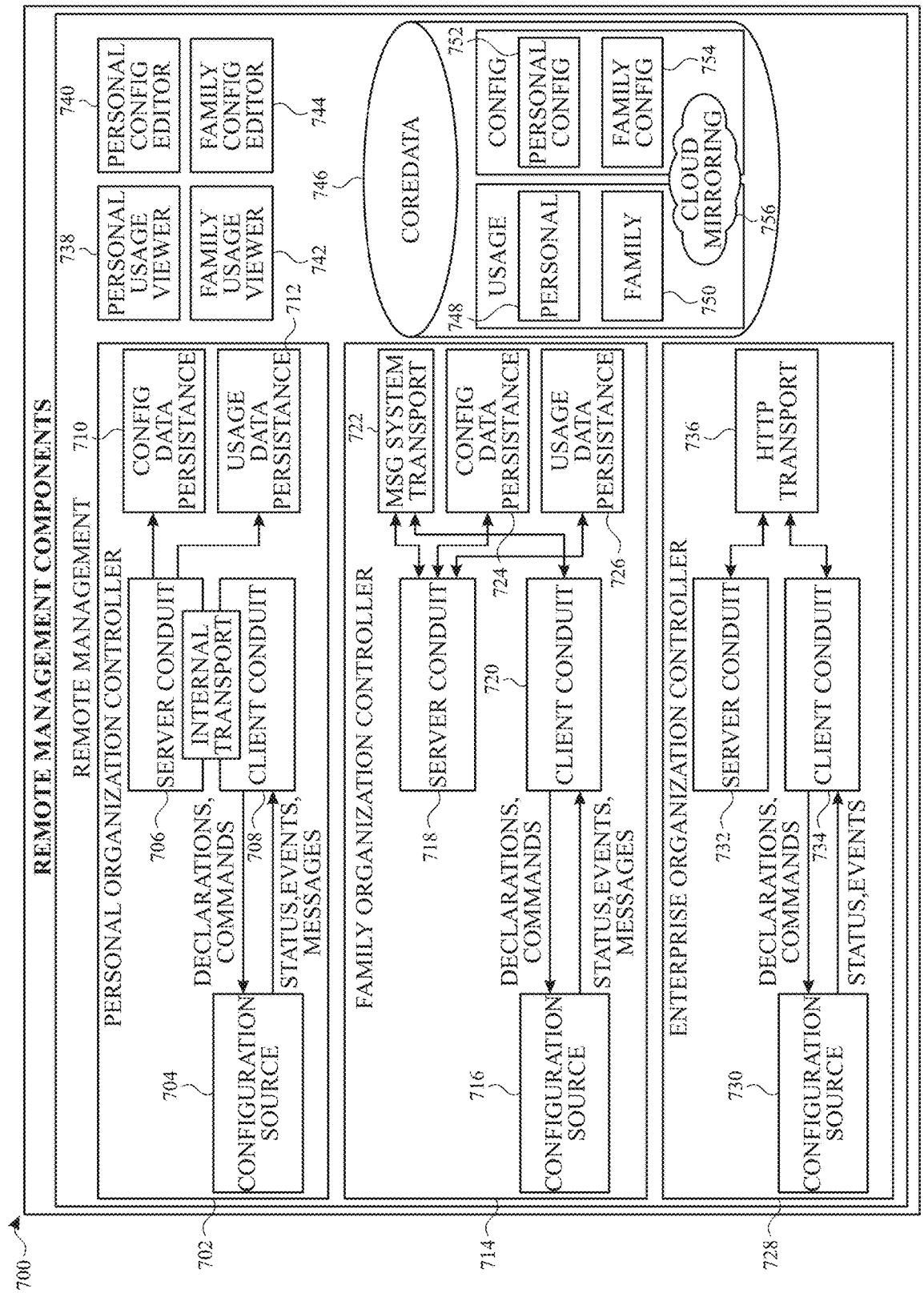
FIG. 7 illustrates an example architecture of a system for the remote management of components for managing device time usage in accordance with one or more implementations.

FIG. 7 illustrates an example architecture of a system for the remote management of components for managing device time usage in accordance with one or more implementations. For example, the remote management architecture 700 can be implemented by one or more software modules running on the host processor 202 of any of the electronic devices 102-104. In another example, the architecture 700 can be implemented by one or more software modules implemented by custom hardware (e.g., one or more coprocessors). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The example of FIG. 7 illustrates that device management (e.g., time-based restrictions for usage time) may be implemented with respect to different sources on the same device (e.g., the electronic device 102). The remote management architecture 700 is described herein with respect to a child. However, the remote management architecture 700 is not limited to a child, and can instead apply to a parent or any other user.

In this regard, a child's device (e.g., any of the electronic devices 102-103) may include a personal organization controller 702 which corresponds to the personal organization controller 516, a family organization controller 714 which corresponds to the family organization controller 502, and an enterprise organization controller 728 which corresponds to the enterprise organization controller 602 (e.g., if the child is a student and a school enterprise sets time-based restrictions for student's devices).

In this regard, the personal organization controller 702 may include a configuration source module 704, a server conduit 706, a client conduit 708, a configuration data persistence module 710 and a usage data persistence module 712 that generally correspond with the components of the personal organization controller 516. In addition, the family organization controller 714 may include a configuration source module 716, a server conduit 718, a client conduit 720, a MSG system transport 722, a configuration data persistence module 724 and a usage data persistence module 726 that generally correspond with the components of family organization controller 502. Moreover, the enterprise organization controller 728 may include a configuration source module 730, a server conduit 732, a client conduit 734, and an HTTP transport module 736 that generally correspond with the components of enterprise organization controller 602.

The remote management architecture 700 may further include a personal usage viewer 738, a personal configuration editor 740, a family usage viewer 742 and a family configuration editor 744 that generally correspond with the components of the architecture 500. In addition, the remote management architecture 700 may include a database 746, usage databases 748 and 750, configuration databases 752 and 754, and a cloud mirroring module 756 that generally correspond with the components of the architecture 500.

Thus, each of the personal organization controller 702, the family organization controller 714 and the enterprise organization controller 728 may represent data coming in from different sources (e.g., personal, family, enterprise). The respective conduits (e.g., 706-708, 718-720 and 732-734) may facilitate with controlling general data flow, for example, with respect to inbound/outbound usage data and/or time-based restrictions. In addition, the respective persistence modules (e.g., 710-712, 724-726) may provide for persistence of data. In the enterprise case, there may not be a persistence layer, and the time-based restrictions may be sent via HTTP transport module 736.

In one or more implementations, one or more of the components 702-756 of the remote management architecture 700 are implemented via software instructions, stored in the memory 204, which when executed by the host processor 202, cause the host processor 202 to perform particular function(s).

In one or more implementations, one or more of the components 702-756 of the remote management architecture 700 may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 8:
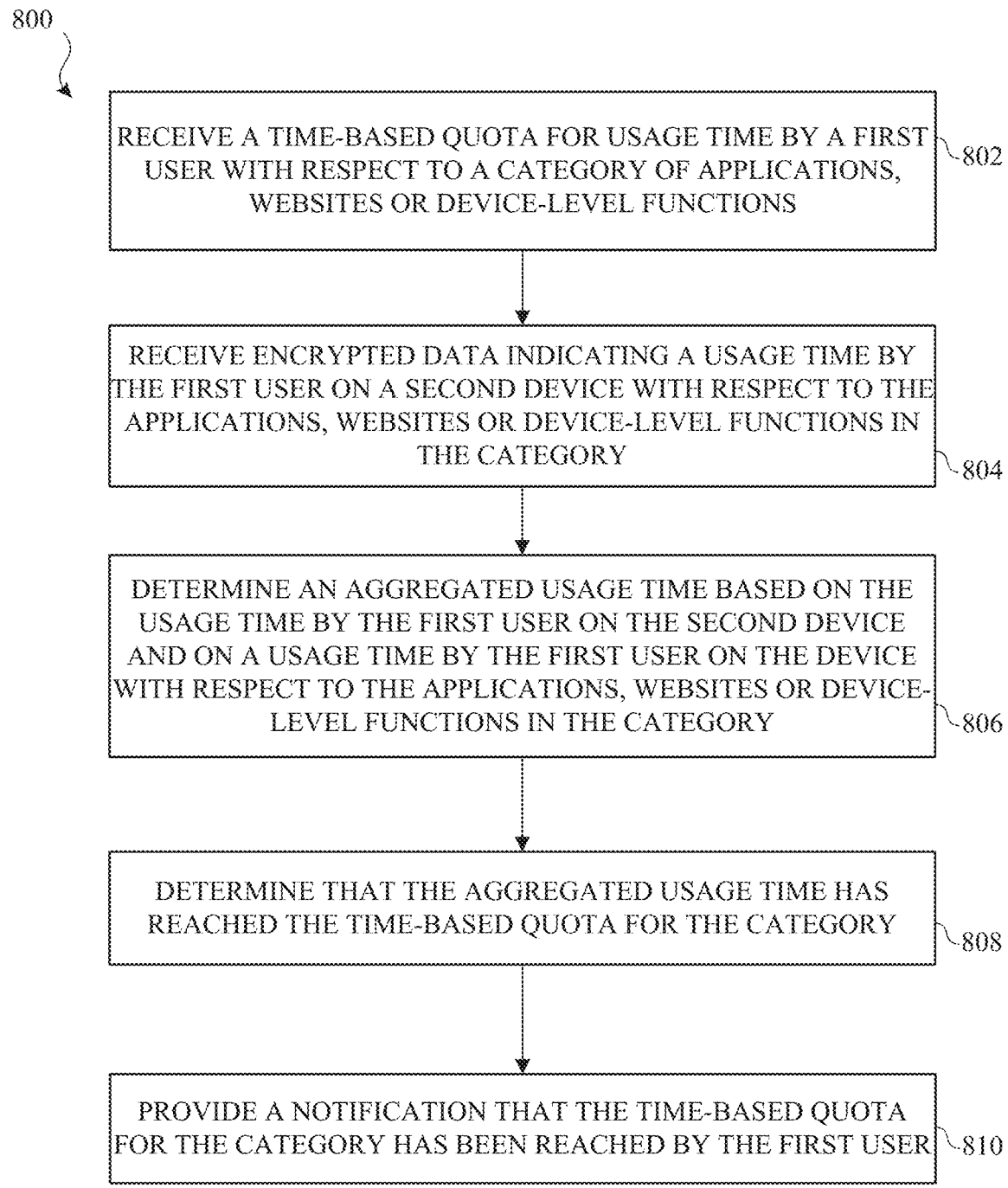
FIG. 8 illustrates an example process for managing device usage time in accordance with one or more implementations.

FIG. 8 illustrates an example process for managing device usage time in accordance with one or more implementations. For explanatory purposes, the process 800 is primarily described herein with reference to the electronic devices 102-104 and the server 108 of FIG. 1. However, the process 800 is not limited to the electronic devices 102-104 and the server 108 of FIG. 1. Moreover, one or more blocks (or operations) of the process 800 may be performed by one or more other components of the server 108 and/or by other suitable devices. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

The electronic device 102 (e.g., a first device) receives a time-based quota for usage by a first user with respect to a category of applications, websites or device-level functions (802). The category may be based on a particular topic, and may include a predefined set of one or more applications, websites or device-level functions corresponding to the particular topic.

The time-based quota may be set by the first user. Alternatively or in addition, the time-based quota may be set by a second user (e.g., a parent of the first user) associated with a third device (e.g., the electronic device 104).

In a case where a second user (e.g., a parent) sets the time-based quota, receiving the time-based quota may include receiving encrypted data indicating the time-based quota, access of which is limited to the electronic devices 102-104. The encrypted data indicating the time-based quota may be received from the electronic device 104 via a message transport system. Alternatively or in addition, the encrypted data indicating the time-based quota may be stored on the server 108, and the electronic device 102 may store a key for accessing the encrypted data indicating the time-based quota from the server 108.

The electronic device 104 may be configured to obtain, from a public data source (e.g., a public endpoint associated with an on-line application store), a graphical icon representative of an application which is associated with the aggregated usage and which is not installed on the electronic device 104. For example, the graphical icon may provide context within the user interface showing usage (e.g., as provided by others' usage viewer 418) for a parent user of the electronic device 104.

The electronic device 102 receives encrypted data indicating a usage by the first user on the electronic device 103 (e.g., a second device of the first user) with respect to the applications, websites or device-level functions in the category (804). The encrypted data indicating the usage may be end-to-end encrypted between the electronic device 102 and the electronic device 103. For example, access to the encrypted data indicating the usage may be limited to the electronic devices 102-103, and/or the electronic device 104 (e.g., in a case where the second user sets the time-based restriction).

The encrypted data indicating the usage by the first user on the electronic device 103 may be stored on the server 108, and the electronic device 102 may store a key for accessing the encrypted data indicating the usage from the server 108. For example, the encrypted data indicating the usage by the first user on the electronic device 103 may be stored on the server 108 in association with at least one encrypted data container corresponding to usage by the first user across multiple devices (e.g., the electronic devices 102-103). Alternatively or in addition, the electronic device 102 may receive the encrypted data from the electronic device 103 via a device-to-device communication protocol.

Receiving the encrypted data indicating the usage may be performed in association with a synchronization policy that indicates when to synchronize the usage between the electronic device 102 and the electronic device 103. For example, the synchronization policy may indicate one of more of: synchronizing the usage more frequently in a case where the first user is associated with multiple devices instead of a single device; synchronizing the usage more frequently as the aggregated usage approaches the time-based quota; and/or synchronizing at a current time (e.g., immediately, or as soon as possible based on device availability) in a case where user interaction is detected with respect to a user interface associated with the time-based quota for usage.

The electronic device 102 determines an aggregated usage based on the usage by the first user on the electronic device 103 and on a usage by the first user on the electronic device 102 with respect to the applications, websites or device-level functions in the category (806). Determining the aggregated usage may include de-duping simultaneous usage by the first user on the electronic device 102 and the electronic device 103 corresponding to a same application, a same website or a same device-level function in the category.

In a case where a second user (e.g., a parent) sets the time-based quota (e.g., via the electronic device 104), the electronic device 102 may provide encrypted data indicating the aggregated usage to the electronic device 104, such that access to the aggregated usage is limited to the electronic devices 102-104. The encrypted data indicating the aggregated usage may be provided to the electronic device 104 via a message transport system. Alternatively or in addition, the encrypted data indicating the aggregated usage may be stored on the server 108, and the electronic device 104 may store a key for accessing the encrypted data indicating the aggregated usage from the server 108.

The electronic device 102 determines that the aggregated usage has reached the time-based quota for the category (808). In a case where a second user (e.g., a parent) sets the time-based quota (e.g., via the electronic device 104), the electronic device 102 may receive an indication of authorization by the second user to adjust the time-based quota, for example, in response to a request by the first user to increase the time-based quota. In response to receiving the indication, the electronic device 102 may adjust the time-based quota. The electronic device 102 may receive the indication of authorization locally as user input of an authentication (e.g., entered by a parent on the child's electronic device 102) to authorize adjusting the time-based quota. For example, the authentication can correspond to inputting a registration code, or other credentials such as biometric authentication (e.g., fingerprint scanning, facial recognition). Alternatively or in addition, the electronic device 102 may receive, from the electronic device 104, the indication of authorization by the second user (e.g., the parent) to adjust the time-based quota.

In response to determining that the aggregated usage has reached the time-based quota, the electronic device 102 provides a notification that the time-based quota for the category has been reached by the first user (810). The electronic device 102 may also prevent the first user from accessing the applications, websites or device-level functions in the category.

In one or more implementations, the electronic device 102 may detect deletion of an application in the category. In response to detecting the deletion, the electronic device 102 may remove data on the electronic device 102 that identifies the application, and maintain a record of usage with respect to the category corresponding to the application. Alternatively or in addition, the electronic device 102 may detect deletion of browser history corresponding to a website in the category. In response to detecting the deletion, the electronic device 102 may remove data on the electronic device 102 that identifies the browser history corresponding to the website, and maintain a record of usage with respect to the category corresponding to the browser history corresponding to the website.

Figure 9:
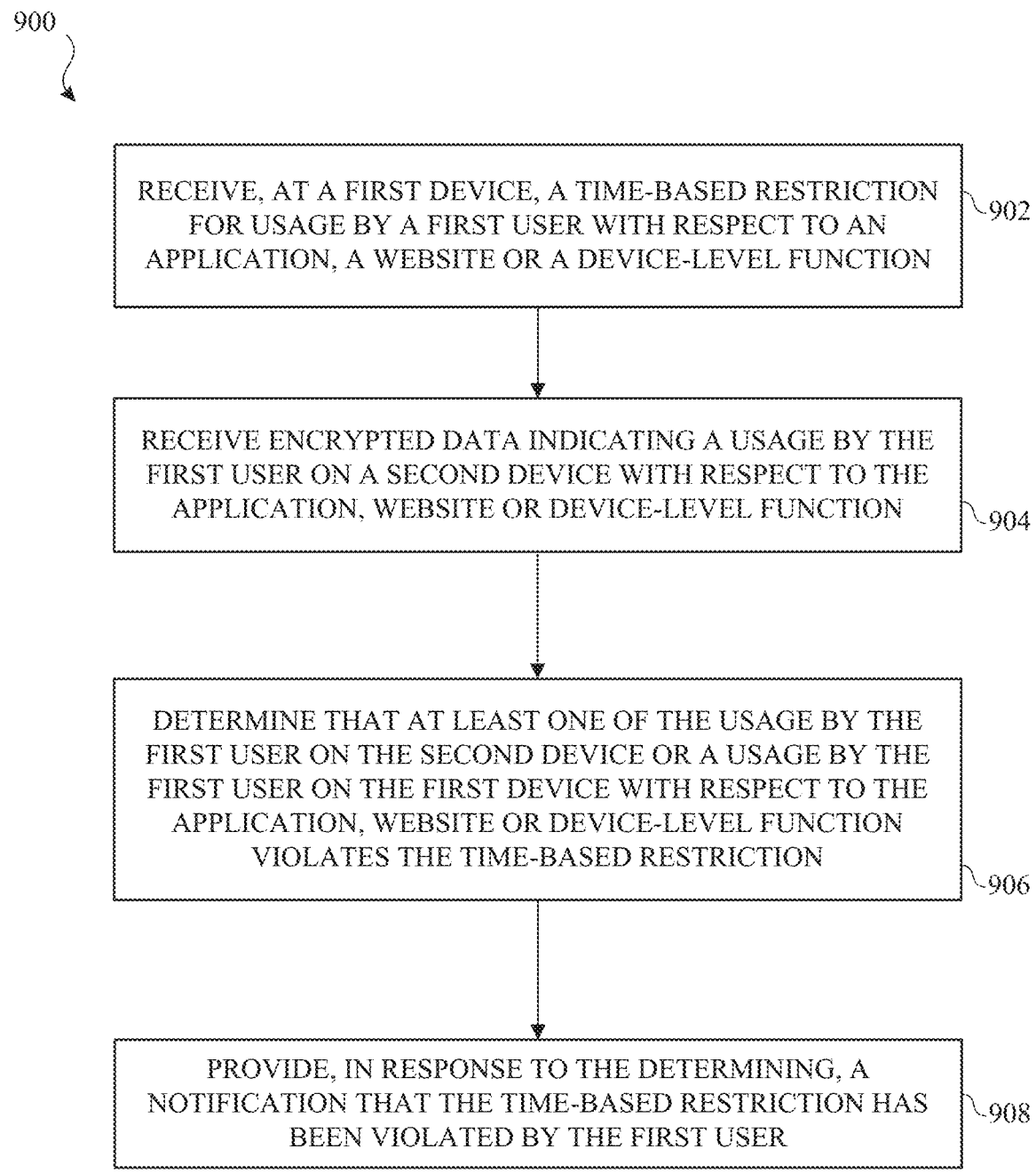
FIG. 9 illustrates another example process for managing device usage time in accordance with one or more implementations.

FIG. 9 illustrates another example process for managing device usage time in accordance with one or more implementations. For explanatory purposes, the process 900 is primarily described herein with reference to the electronic devices 102-104 and the server 108 of FIG. 1. However, the process 900 is not limited to the electronic devices 102-104 and the server 108 of FIG. 1. Moreover, one or more blocks (or operations) of the process 900 may be performed by one or more other components of the server 108 and/or by other suitable devices. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

The electronic device 102 (e.g., a first device) receives a time-based restriction for usage by a first user with respect to an application, a website or a device-level function (902). The time-based restriction may be set by the first user. Alternatively or in addition, the time-based restriction may be set by a second user (e.g., a parent of the first user) associated with a third device (e.g., the electronic device 104).

In a case where a second user (e.g., a parent) sets the time-based restriction, receiving the time-based restriction may include receiving encrypted data indicating the time-based restriction, access of which is limited to the electronic devices 102-104. The encrypted data indicating the time-based restriction may be received from the electronic device 104 via a message transport system. Alternatively or in addition, the encrypted data indicating the time-based restriction may be stored on the server 108, and the electronic device 102 may store a key for accessing the encrypted data indicating the time-based restriction from the server 108.

The electronic device 102 receives encrypted data indicating a usage by the first user on the electronic device 103 (e.g., a second device of the first user) with respect to the application, website or device-level function (904). The encrypted data indicating the usage may be end-to-end encrypted between the electronic device 102 and the electronic device 103. For example, access to the encrypted data indicating the usage may be limited to the electronic devices 102-103, and/or the electronic device 104 (e.g., in a case where the second user sets the time-based restriction).

The encrypted data indicating the usage by the first user on the electronic device 103 may be stored on the server 108, and the electronic device 102 may store a key for accessing the encrypted data indicating the usage from the server 108. For example, the encrypted data indicating the usage by the first user on the electronic device 103 may be stored on the server 108 in association with at least one encrypted data container corresponding to usage by the first user across multiple devices (e.g., the electronic devices 102-103). Alternatively or in addition, the electronic device 102 may receive the encrypted data from the electronic device 103 via a device-to-device communication protocol.

Receiving the encrypted data indicating the usage may be performed in association with a synchronization policy that indicates when to synchronize the usage between the electronic device 102 and the electronic device 104. For example, the synchronization policy may indicate one of more of: synchronizing the usage more frequently in a case where the first user is associated with multiple devices instead of a single device; synchronizing the usage more frequently as a usage (e.g., aggregated usage) approaches the time-based restriction (e.g., quota); and/or synchronizing at a current time in a case where user interaction is detected with respect to a user interface associated with the time-based restriction for usage.

The electronic device 102 determines that at least one of the usage by the first user on the electronic device 103 or a usage by the first user on the electronic device 102 with respect to the application, website or device-level function violates the time-based restriction (906). In this regard, the time-based restriction may correspond to a curfew (e.g., a timeframe during which usage is restricted), where usage by the first user on either the first or second device during the timeframe would violate the curfew. Alternatively or in addition, the time-based restriction may correspond to a budget (e.g., a total amount of permitted usage), and usage may violate the budget when the aggregated time for the first and second devices exceeds the budget. Determining the aggregated usage may include de-duping simultaneous usage by the first user on the electronic device 102 and the electronic device 103 corresponding to a same application, a same website or a same device-level function in the category.

In a case where a second user (e.g., a parent) sets the time-based restriction (e.g., via the electronic device 104), the electronic device 102 may provide encrypted data indicating the usage to the electronic device 104, such that access to the usage is limited to the electronic devices 102-104. The encrypted data indicating the usage may be provided to the electronic device 104 via a message transport system. Alternatively or in addition, the encrypted data indicating the usage may be stored on the server 108, and the electronic device 104 may store a key for accessing the encrypted data indicating the aggregated usage from the server 108.

In a case where a second user (e.g., a parent) sets the time-based restriction (e.g., via the electronic device 104), the electronic device 102 may receive an indication of authorization by the second user to adjust the time-based restriction, for example, in response to a request by the first user to increase the time-based restriction. In response to receiving the indication, the electronic device 102 may adjust the time-based restriction. The electronic device 102 may receive the indication of authorization as user input of an authentication (e.g., registration code or biometric authentication entered by a parent on the child's electronic device 102) to authorize adjusting the time-based restriction. Alternatively or in addition, the electronic device 102 may receive, from the electronic device 104, the indication of authorization by the second user (e.g., the parent) to adjust the time-based restriction.

Upon detection a violation, the electronic device 102 provides a notification that the time-based restriction has been violated by the first user (908). The electronic device 102 may further prevent the first user from accessing the application, website or device-level function.

In one or more implementations, the electronic device 102 may detect deletion of an application in the category. In response to detecting the deletion, the electronic device 102 may remove data on the electronic device 102 that identifies the application, and maintain a record of usage with respect to the category corresponding to the application. Alternatively or in addition, the electronic device 102 may detect deletion of browser history corresponding to a website in the category. In response to detecting the deletion, the electronic device 102 may remove data on the electronic device 102 that identifies the browser history corresponding to the website, and maintain a record of usage with respect to the category corresponding to the browser history corresponding to the website.

As described above, one aspect of the present technology is the gathering and use of data available from specific and legitimate sources, for example, to manage device usage. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. The present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, managing device usage may be based on aggregated non-personal information data or a bare minimum amount of personal information, such as the content being handled only on the user's device or other available non-personal information.

Figure 10:
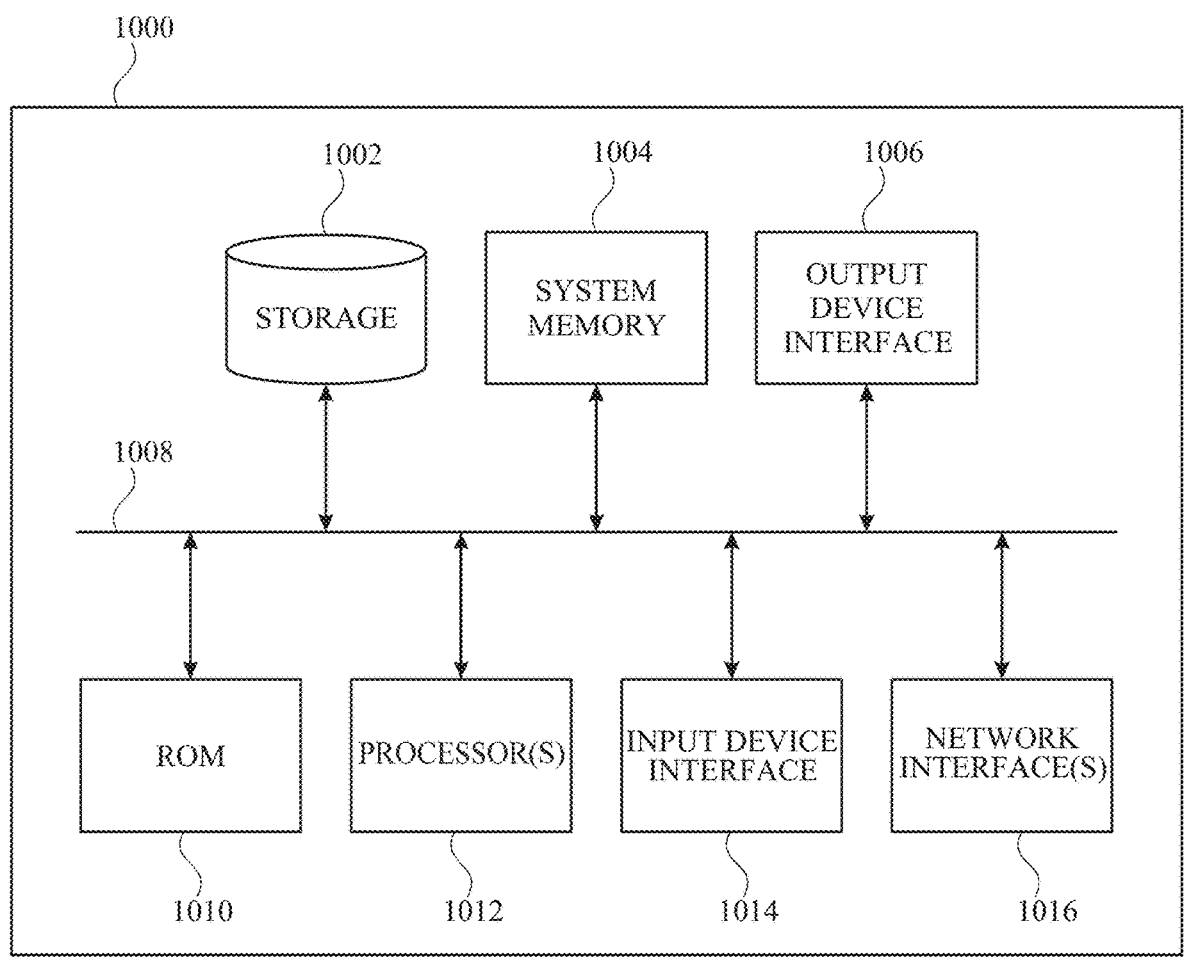
FIG. 10 illustrates an example electronic system with which aspects of the subject technology may be implemented in accordance with one or more implementations.

FIG. 10 illustrates an electronic system 1000 with which one or more implementations of the subject technology may be implemented. The electronic system 1000 can be, and/or can be a part of, one or more of the electronic devices 102-104, and/or one or the server 108 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of files generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the server 108 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
    at least one processor; and
    a memory including instructions that, when executed by the at least one processor, cause the at least one processor to:
        receive a time-based quota for usage by a first user with respect to a category of applications, websites or device-level functions;
        receive encrypted data indicating a usage by the first user on a second device with respect to the applications, websites or device-level functions in the category;
        determine an aggregated usage based on the usage by the first user on the second device and on a usage by the first user on the device with respect to the applications, websites or device-level functions in the category;
        determine that the aggregated usage has reached the time-based quota for the category; and
        provide a notification that the time-based quota for the category has been reached by the first user.

2. The device of claim 1, wherein the encrypted data indicating the usage is end-to-end encrypted between the device and the second device, such that access to the encrypted data indicating the usage is limited to the device and the second device.

3. The device of claim 1, wherein the encrypted data indicating the usage by the first user on the second device is stored on a server, and
    wherein the device stores a key for accessing the encrypted data indicating the usage from the server.

4. The device of claim 3, wherein the encrypted data indicating the usage by the first user on the second device is stored on the server in association with at least one encrypted data container corresponding to usage by the first user across multiple devices.

5. The device of claim 1, wherein the device receives the encrypted data indicating the usage from the second device via a device-to-device communication protocol.

6. The device of claim 1, wherein the time-based quota is set by a second user associated with a third device, and
wherein receiving the time-based quota comprises receiving encrypted data indicating the time-based quota, access of which is limited to the device, the second device and the third device.

7. The device of claim 6, wherein the encrypted data indicating the time-based quota is received from the third device via a message transport system.

8. The device of claim 6, wherein the encrypted data indicating the time-based quota is stored on a server, and the device stores a key for accessing the encrypted data indicating the time-based quota from the server.

9. The device of claim 6, wherein the instructions further cause the at least one processor to:
provide encrypted data indicating the aggregated usage to the third device, such that access to the aggregated usage is limited to the device, the second device and the third device.

10. The device of claim 9, wherein the encrypted data indicating the aggregated usage is provided to the third device via a message transport system.

11. The device of claim 9, wherein the encrypted data indicating the aggregated usage is stored on a server, and the third device stores a key for accessing the encrypted data indicating the aggregated usage from the server.

12. The device of claim 9, wherein the third device is configured to obtain, from a public data source, a graphical icon representative of an application which is associated with the aggregated usage and which is not installed on the third device.

13. The device of claim 6, wherein the instructions further cause the at least one processor to:
receive an indication of authorization by the second user to adjust the time-based quota; and
adjust, in response to receiving the indication, the time-based quota.

14. The device of claim 13, wherein receiving the indication comprises:
receiving, at the device, user input of an authentication to authorize adjusting the time-based quota.

15. The device of claim 13, wherein receiving the indication comprises:
receiving, from the third device, the indication of authorization by the second user to adjust the time-based quota.

16. The device of claim 1, wherein the category is based on a particular topic, and wherein the category comprises a predefined set of one or more applications, websites or device-level functions corresponding to the particular topic.

17. The device of claim 1, wherein the instructions further cause the at least one processor to:
prevent, in response to determining that the aggregated usage has reached the time-based quota for the category, the first user from accessing the applications or websites in the category.

18. The device of claim 1, wherein receiving the encrypted data indicating the usage is performed in association with a synchronization policy that indicates when to synchronize the usage between the device and the second device.

19. The device of claim 18, wherein the synchronization policy indicates to synchronize the usage more frequently in a case where the first user is associated with multiple devices instead of a single device.

20. The device of claim 18, wherein the synchronization policy indicates to synchronize the usage more frequently as the aggregated usage approaches the time-based quota.

21. The device of claim 18, wherein the synchronization policy indicates to synchronize at a current time in a case where user interaction is detected with respect to a user interface associated with the time-based quota for usage.

22. The device of claim 1, wherein the instructions further cause the at least one processor to:
detect deletion of an application in the category; and
in response to detecting the deletion,
remove data on the device that identifies the application, and
maintain a record of usage with respect to the category corresponding to the application.

23. The device of claim 1, wherein the instructions further cause the at least one processor to:
detect deletion of browser history corresponding to a website in the category; and
in response to detecting the deletion,
remove data on the device that identifies the browser history corresponding to the website, and
maintain a record of usage with respect to the category corresponding to the browser history corresponding to the website.

24. The device of claim 1, wherein determining the aggregated usage comprises de-duping simultaneous usage by the first user on the device and the second device corresponding to a same application, a same website or a same device-level function in the category.

25. A computer program product comprising code stored in a non-transitory computer-readable storage medium, the code comprising:
code to receive, at a first device, a time-based restriction for usage by a first user with respect to an application, a website or a device-level function;
code to receive encrypted data indicating a usage by the first user on a second device with respect to the application, website or device-level function;
code to determine, at the first device, an aggregated usage based on the usage by the first user on the second device and on the usage by the first user on the first device with respect to the application, website or device-level function;
code to determine that the aggregated usage by the first user with respect to the application, website or device-level function violates the time-based restriction; and
code to provide, in response to the determining, a notification that the time-based restriction has been violated by the first user.

26. The computer program product of claim 25, wherein the device-level function corresponds to overall device usage.

27. The computer program product of claim 25, wherein the device-level function corresponds to display, audio, a sensor function, an accessory or a resource of the device.

28. The computer program product of claim 25, wherein the time-based restriction corresponds to a time-based quota for usage corresponding to the device-level function.

29. A method comprising:
receiving, by a first device, a time-based restriction for usage by a first user on the first device and on a second device with respect to a category of applications, websites or device-level functions;

receiving encrypted data indicating a usage by the first user on the second device with respect to the applications, websites or device-level functions in the category;

determining, by the first device, an aggregated usage based on the usage by the first user on the second device and on the usage by the first user on the first device with respect to the applications, websites or device-level functions in the category;

determining that the aggregated usage by the first user with respect to the applications, websites or device-level functions in the category violates the time-based restriction; and providing, in response to the determining, a notification that the time-based restriction has been violated by the first user.

30. A method comprising:

receiving, by a first device, a time-based restriction for usage by a first user on the first device and on a second device with respect to a device-level function;

receiving encrypted data indicating a usage by the first user on the second device with respect to the device-level function;

determining, by the first device, an aggregated usage based on the usage by the first user on the second device and on the usage by the first user on the first device with respect to the device-level function;

determining that the aggregated usage by the first user with respect to the device-level function violates the time-based restriction; and providing, in response to the determining, a notification that the time-based restriction has been violated by the first user.

31. The method of claim 30, wherein the device-level function corresponds to overall device usage.

32. The method of claim 30, wherein the device-level function corresponds to display, audio, a sensor function, an accessory or a resource of the device.

33. The method of claim 30, wherein the time-based restriction corresponds to a time-based quota for usage corresponding to the device-level function.

34. The method of claim 30, wherein the time-based restriction corresponds to a number-based quota limiting a number of times of usage corresponding to the device-level function.

35. The method of claim 30, further comprising:

limiting usage of the device-level function in response to determining the violation.

36. The method of claim 35, wherein the limiting disallows use of the device-level function.

37. The method of claim 35, wherein the limiting limits output levels for the device-level function.

* * * * *